United States Patent
Yamamoto et al.

(10) Patent No.: US 10,483,604 B2
(45) Date of Patent: Nov. 19, 2019

(54) BATTERY PACK

(71) Applicant: DENSO CORPORATION, Kariya, Aichi-pref. (JP)

(72) Inventors: Hiroyoshi Yamamoto, Kariya (JP); Yoshimitsu Inoue, Kariya (JP); Koji Yamashita, Kariya (JP); Shota Iguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 15/561,295

(22) PCT Filed: Jun. 16, 2016

(86) PCT No.: PCT/JP2016/067863
§ 371 (c)(1),
(2) Date: Sep. 25, 2017

(87) PCT Pub. No.: WO2017/026169
PCT Pub. Date: Feb. 16, 2017

(65) Prior Publication Data
US 2018/0102576 A1    Apr. 12, 2018

(30) Foreign Application Priority Data
Aug. 7, 2015  (JP) .................................. 2015-157257

(51) Int. Cl.
*H01M 10/6556*   (2014.01)
*H01M 10/625*   (2014.01)
(Continued)

(52) U.S. Cl.
CPC ..... *H01M 10/6556* (2015.04); *H01M 2/1077* (2013.01); *H01M 10/613* (2015.04);
(Continued)

(58) Field of Classification Search
None
See application file for complete search history.

(56) References Cited

U.S. PATENT DOCUMENTS

2002/0102454 A1*  8/2002  Zhou .................. H01M 2/1083
                                                                429/88
2010/0275619 A1* 11/2010  Koetting ............. H01M 10/613
                                                                62/79
(Continued)

FOREIGN PATENT DOCUMENTS

JP    2009-211829 A    9/2009
JP    2010-015955 A    1/2010
(Continued)

*Primary Examiner* — Alix E Eggerding
(74) *Attorney, Agent, or Firm* — Oliff PLC

(57) ABSTRACT

A battery pack includes: a battery assembly including a plurality of batteries; a fluid drive member driving a fluid which cools the battery assembly; a housing that houses the battery assembly and the fluid drive member; and a beam provided integrally with a bottom wall of the housing to support the battery assembly from a lower side. A circulation passage provided in the housing includes: a first fluid passage between the battery assembly and a side wall of the housing; a battery passage between the batteries; and a second fluid passage downstream of the battery passage and extending toward the fluid drive member. The second fluid passage is surrounded by at least the beams, the bottom wall, and a lower end of the battery assembly.

11 Claims, 11 Drawing Sheets

(51) Int. Cl.
    *H01M 10/613*    (2014.01)
    *H01M 10/6563*   (2014.01)
    *H01M 2/10*      (2006.01)

(52) U.S. Cl.
    CPC ..... *H01M 10/625* (2015.04); *H01M 10/6563* (2015.04); *H01M 2220/20* (2013.01)

(56) References Cited

U.S. PATENT DOCUMENTS

2011/0244291 A1* 10/2011 Sun .................. H01M 10/4207
                                                       429/120
2015/0037632 A1   2/2015  Yamamoto et al.
2015/0037633 A1   2/2015  Akiyama et al.

FOREIGN PATENT DOCUMENTS

| | | |
|---|---|---|
| JP | 2014-036001 A | 2/2014 |
| JP | 2015-072741 A | 4/2015 |
| JP | 2017-037752 A | 2/2017 |

* cited by examiner

BATTERY PACK

CROSS REFERENCE TO RELATED APPLICATION

This application is based on Japanese Patent Application No. 2015-157257 filed on Aug. 7, 2015, the disclosure of which is incorporated herein by reference.

TECHNICAL FIELD

The present disclosure relates to a battery pack having battery cells housed in a casing.

BACKGROUND ART

A battery pack housing battery cells is described in Patent Literature 1. The battery pack of Patent Literature 1 includes multiple batteries and a fan device developing convection currents in a housing mounted to an automobile. In the battery pack, multiple cells are cooled with air blown out from the fan device by letting the air circulate in the housing while developing convection currents such that make contact with the batteries in the housing.

PRIOR ART LITERATURES

Patent Literature

Patent Literature 1: JP 2009-211829 A

SUMMARY OF INVENTION

In the battery pack of Patent Literature 1, a circulation passage in which air flows out from an outlet portion of the fan device and flows back into an inlet portion of the fan device by flowing around the batteries is not a clearly defined passage to force air to flow around every single battery. Hence, air blown out from the fan device may fail to reach near every single battery and the entire air may return to the fan device by taking a shortcut. In such a case, it is difficult to absorb heat equally from the respective batteries by forcing circulating air to flow around every single battery. Hence, effective heat dissipation via a housing wall may not be achieved.

In addition, the battery pack of Patent Literature 1 does not have a structure to make the housing of the battery pack more rigid. Hence, the housing may not be strong enough to protect the battery cells against an impact applied to the battery pack for some reason. In particular, a battery pack mounted to a vehicle has a potential risk of an impact in the event of a collision and requires a structure to protect the battery cells against an impact.

The present disclosure has an object to provide a battery pack capable of achieving efficient heat dissipation from a housing and protecting a battery against an impact.

According to an aspect of the present disclosure, a battery pack includes: a battery assembly including a plurality of batteries; a fluid drive member driving a fluid which cools the battery assembly; a housing that houses the battery assembly and the fluid drive member; a circulation passage provided in the housing and forming a series of flow channels for the fluid flowing out from the fluid drive member to flow back into the fluid drive member after exchanging heat with the batteries; and a plurality of beams provided integrally with a bottom wall of the housing to support the battery assembly from a lower side. The circulation passage includes: a first fluid passage provided between the battery assembly and a wall of the housing to be a heat dissipation portion which dissipates heat to an outside of the housing by contact with the fluid flowing out from the fluid drive member; a battery passage provided between the batteries adjacent to each other in the battery assembly; and a second fluid passage downstream of the battery passage and extending toward an inflow portion of the fluid drive member. The first fluid passage, the battery passage, and the second fluid passage are a series of passages provided for the fluid flowing the first fluid passage to flow into the second fluid passage after passing through the battery passage. The second fluid passage is surrounded by at least the beams, the bottom wall, and a lower end of the battery assembly.

According to the configuration as above, the circulation passage is formed to let a fluid flowing through the first fluid passage flow into the second fluid passage by flowing through the battery passage. Hence, a fluid flowing out from the fluid drive member can be prevented from flowing into the second fluid passage before passing through the first fluid passage. Accordingly, fluid flowing out from the fluid drive member sequentially flows the first fluid passage and the battery passage and flows back into the fluid drive member by flowing the second fluid passage. The configuration as above enables a fluid carrying heat absorbed from the cells while flowing through the battery passage to dissipate the heat to the outside of the housing when flowing the first fluid passage. Consequently, reliable heat dissipation via the housing can be achieved.

In addition, the multiple beams are provided on the bottom wall. Hence, the respective beams function as reinforcing members and strength of the housing can be increased. The multiple cells are located on the respective beams. Hence, should an impact be applied from the outside of the housing, the impact can be received by the respective beams. Consequently, a battery pack capable of realizing efficient heat dissipation from the housing and protecting the batteries against an impact can be provided.

DESCRIPTION OF EMBODIMENTS

Figure 1:
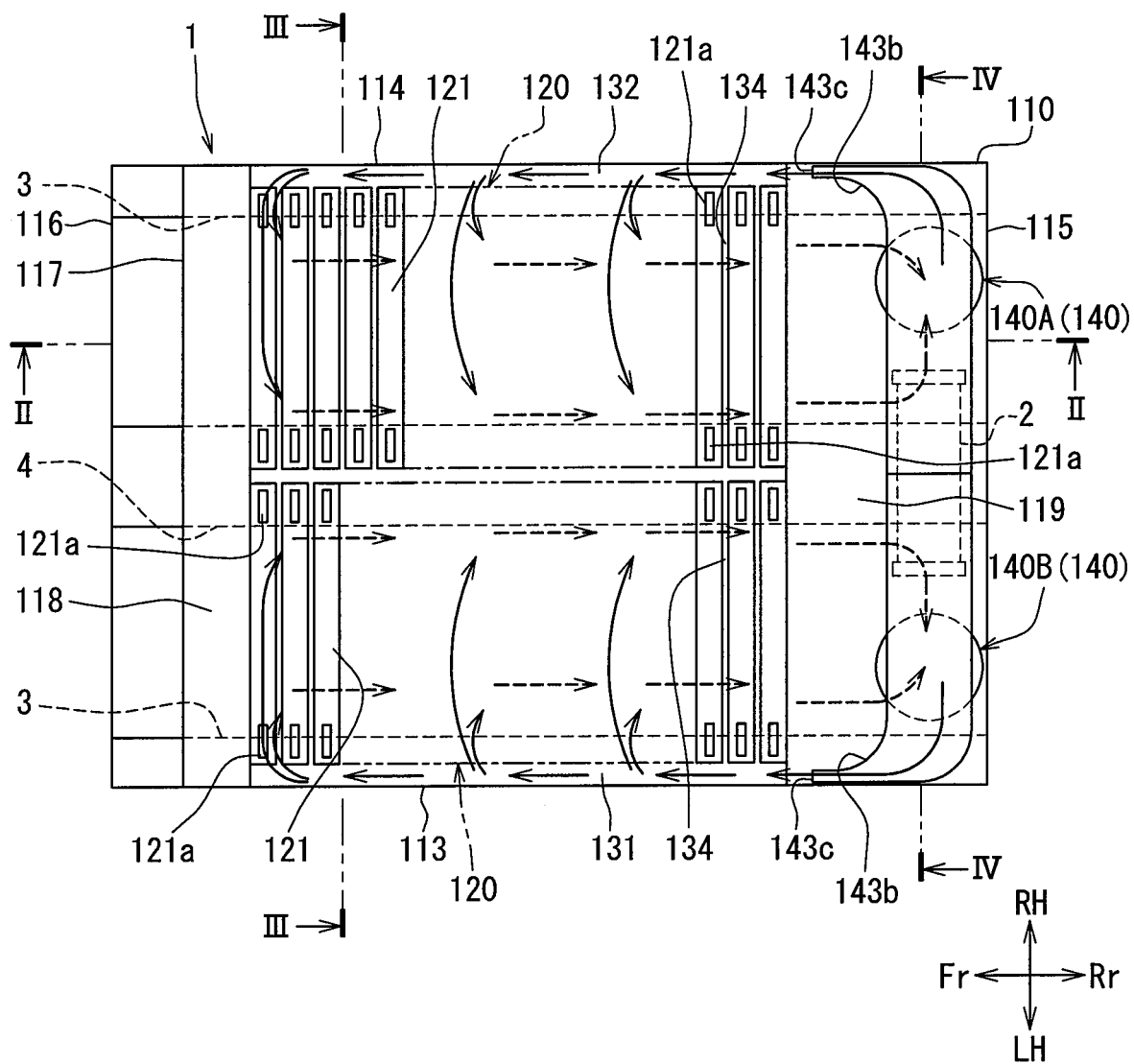
FIG. 1 is a top view showing a configuration of a battery pack according to a first embodiment, and a flow of fluid in the battery pack.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A battery pack 1 of a first embodiment will be described with reference to FIG. 1 through FIG. 14. The battery pack 1 is employed in, for example, a hybrid automobile run by both a motor driven on electrical power charged to a battery and an internal combustion engine as a drive source, or an electric automobile run by a motor as a drive source. Multiple cells 121 included in the battery pack 1 are, for example, nickel metal hydride batteries, lithium-ion rechargeable batteries, or organic radical batteries.

The battery pack 1 is installed to a pack storing space, such as a trunk room of a vehicle or an area on a back of the trunk room provided below the trunk room. Alternatively, the pack storing space may be a space where, for example, a spare tire, tools, and so on can be also stored. The battery pack 1 is installed in the battery pack storing space in a posture with a bottom wall 112 and a bottom wall passage 135 on an underside.

The battery pack 1 may be installed under a front seat or a back seat provided to a compartment of the vehicle. In such a case, the battery pack 1 is installed under the front seat or the back seat in a posture with the bottom wall 112 and the bottom wall passage 135 on the underside. A space in which to install the battery pack 1 under the back seat may communicate with the area on the back of the trunk room below the trunk room. Alternatively, the installation space may communicate with an outside of the vehicle.

In the present embodiment, as an example, Fr of FIG. 1 denotes a vehicle front side, Rr denotes a vehicle rear side, RH denotes a vehicle right side, and LH denotes a vehicle left side. The direction Rr and the direction Fr are a battery stacking direction. As a direction in reference to the battery pack 1, a direction Fr-Rr may be referred to also as the front-rear direction or the battery stacking direction. A direction RH-LH may be referred to also as the right-left direction. A direction of gravity action may be referred to also as the top-bottom direction.

The battery pack 1 includes a housing 110 defining an internal space which is hermetically sealed and isolated from the outside, and a battery assembly 120 formed by electrically connecting the multiple cells 121 to pass a current and housed in the housing 110. One or more than one battery assembly 120 is housed in the housing 110 and forms an assembled battery of the battery pack 1. A circulation passage 130 in which a fluid cooling the respective cells 121 in the battery assembly 120 circulates and an air blower 140 forcing the fluid to circulate in the circulation passage 130 are housed in the housing 110. An example of the battery assembly 120 is a battery stack formed by integrally stacking the multiple cells 121 in a posture with surfaces having a largest surface area called main surfaces oriented face to face.

Figure 5:
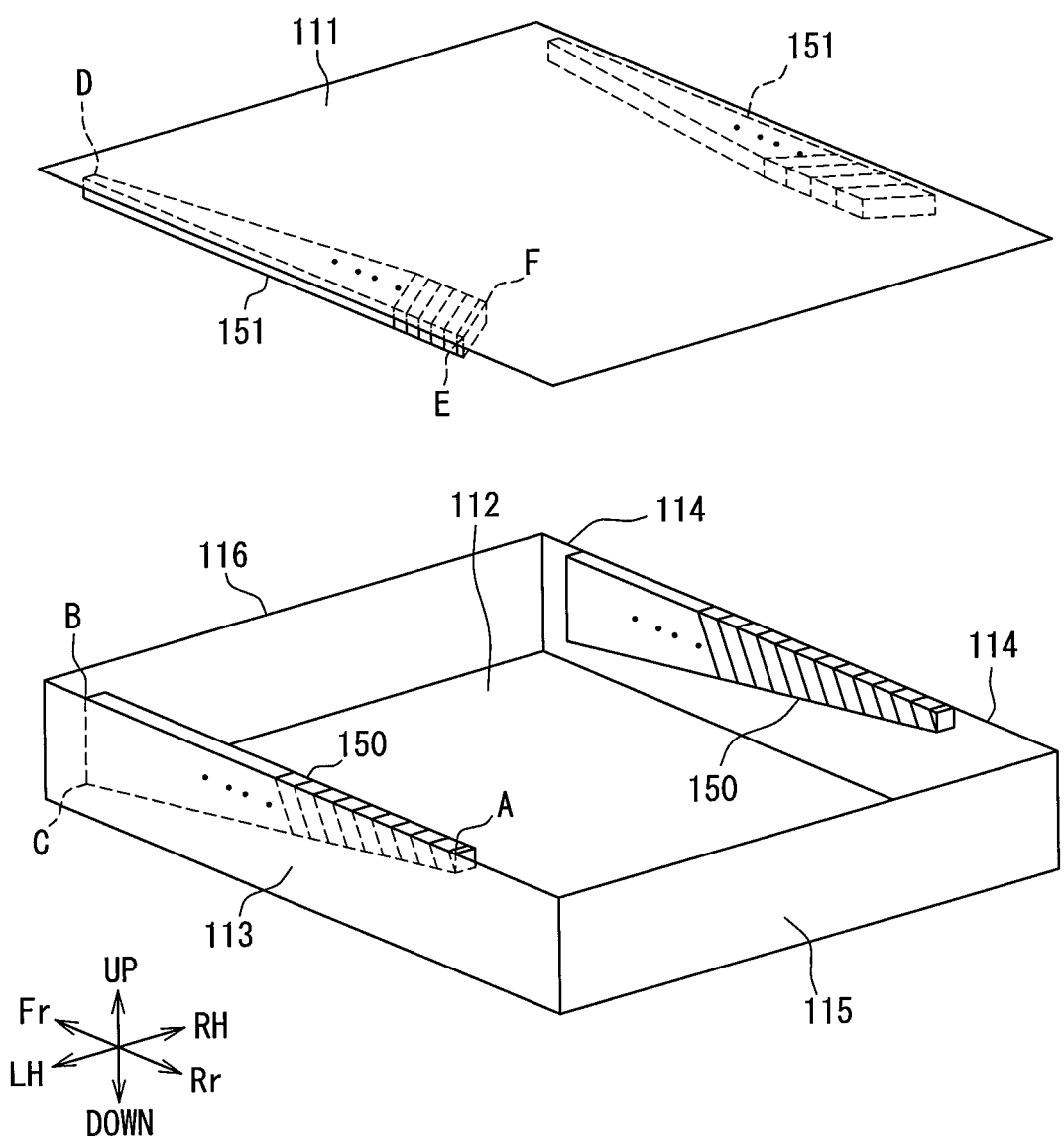
FIG. 5 is an exploded perspective view of an internal fin.
Figure 6:
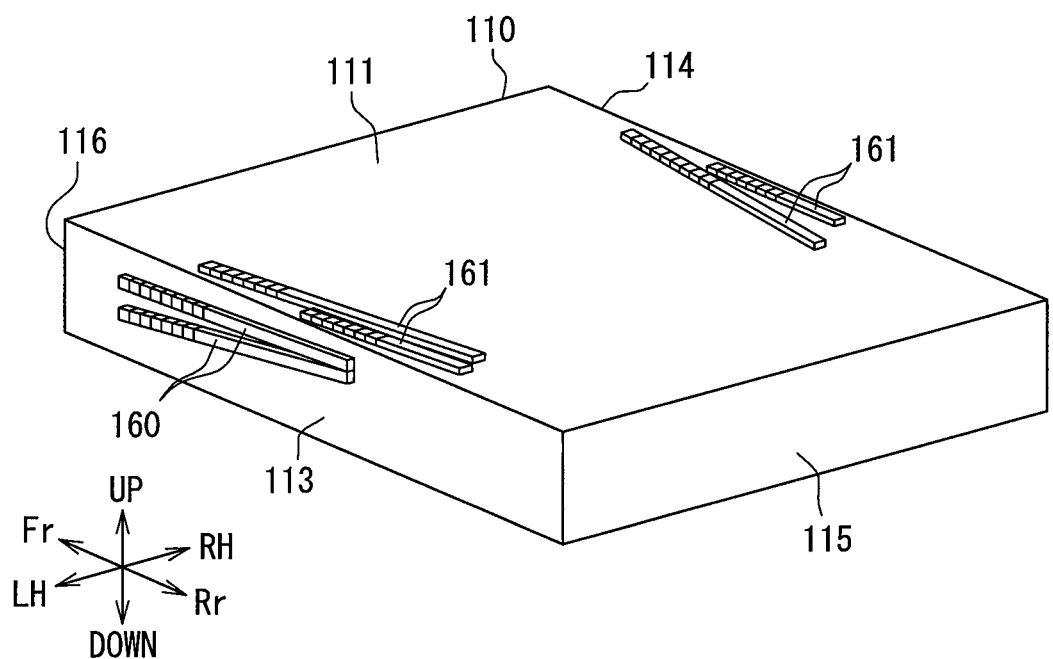
FIG. 6 is a perspective view of an external fin.
Figure 7:
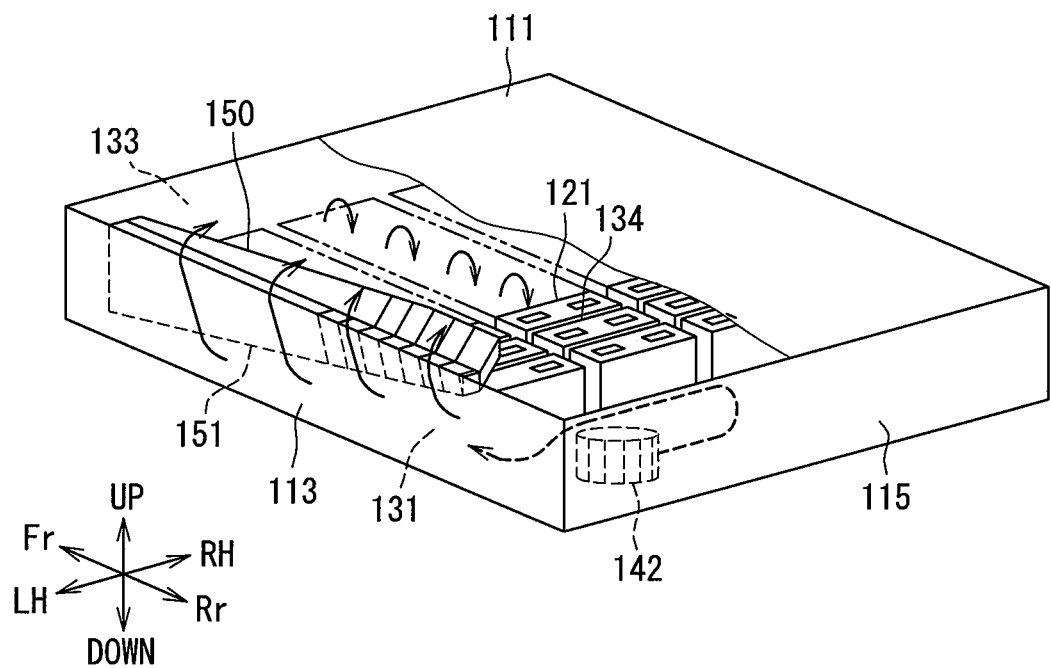
FIG. 7 is a perspective view showing flow of fluid inside a housing due to the internal fin.
Figure 8:
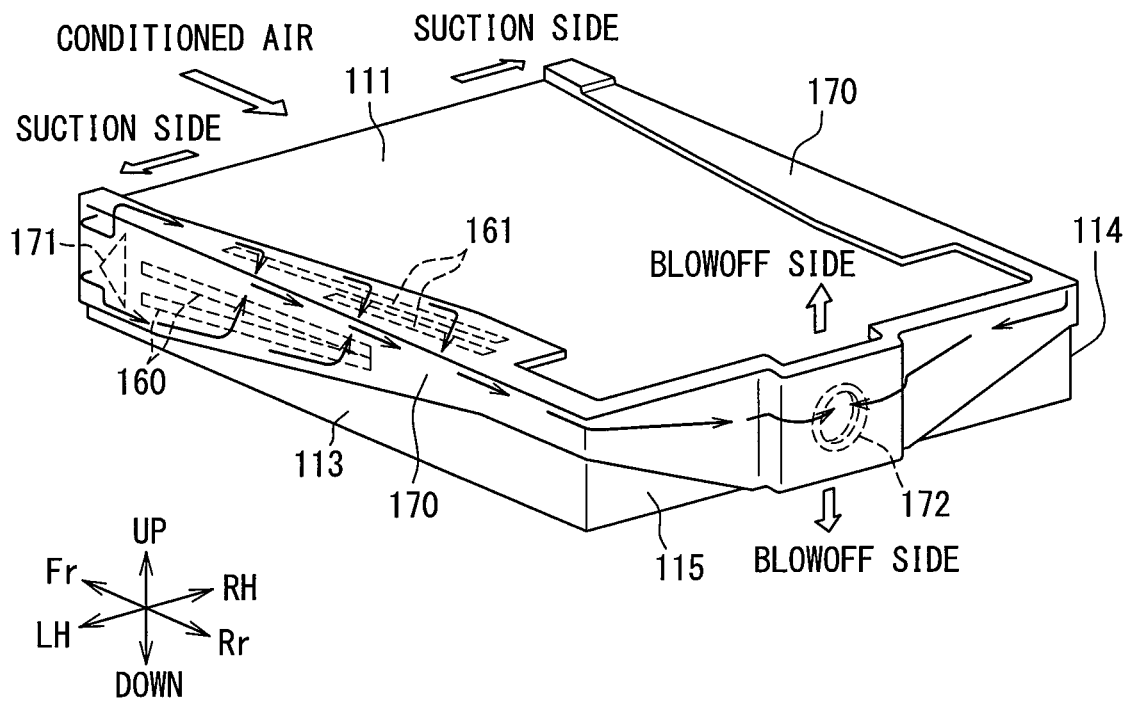
FIG. 8 is a perspective view showing flow of fluid inside an external duct.

In the battery pack 1, first internal fins 150 and second internal fins 151 are provided inside of the housing 110, and first external fins 160 and second external fins 161 are provided outside of the housing 110 (see FIG. 5 and FIG. 6). As is shown in FIG. 8, an external duct 170 having an air blower 172 is provided to an outside of the external fins 160 and 161 to cover the external fins 160 and 161.

Figure 3:
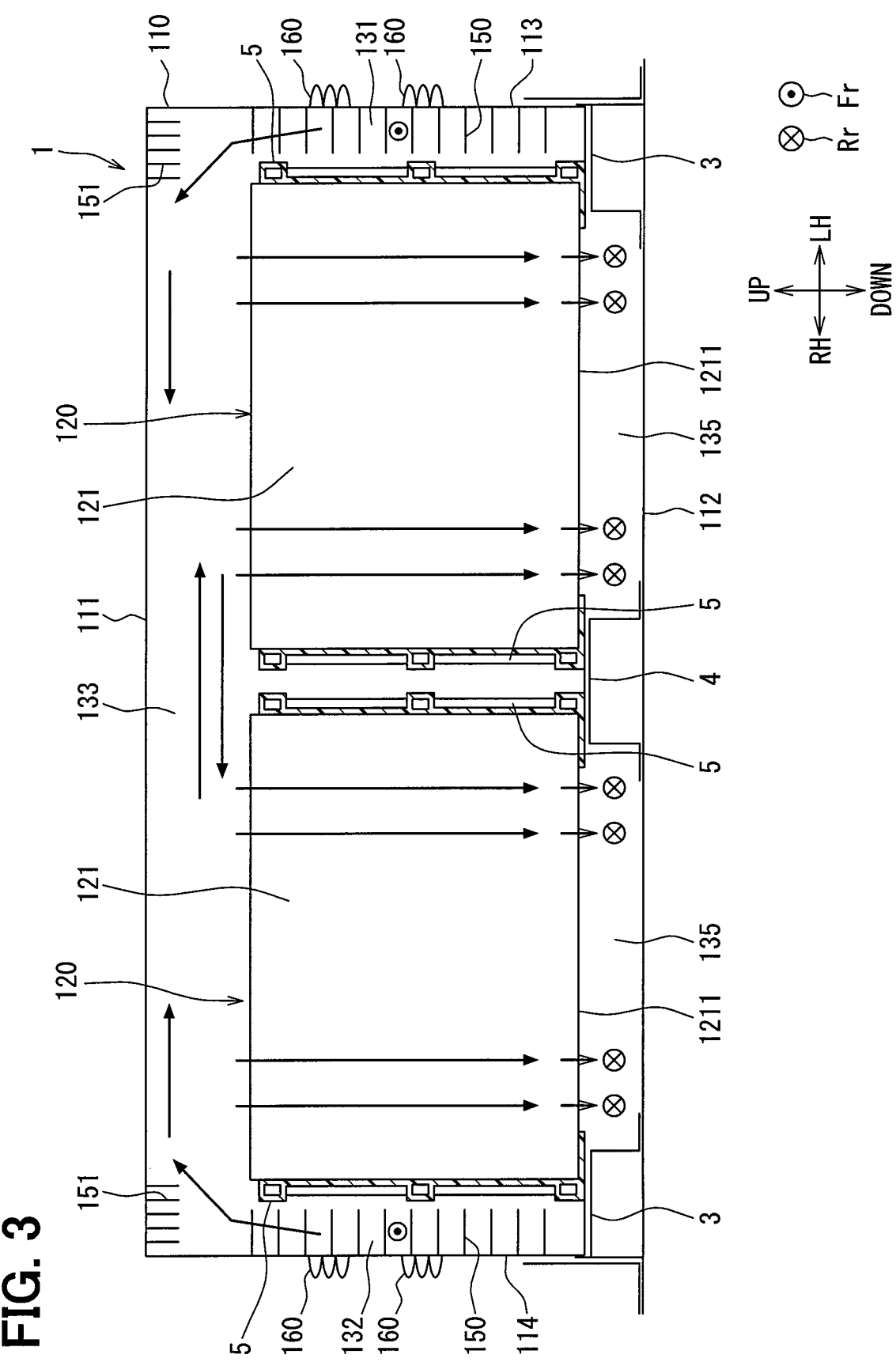
FIG. 3 is a sectional view taken along a line III-III of FIG. 1 when viewed from a direction indicated by arrows.

As are shown in FIG. 1 and FIG. 3, the housing 110 houses two battery assemblies 120 aligned side by side in the right-left direction, and two air blowers, namely, a first air blower 140A and a second air blower 140B also aligned side by side in the right-left direction more on the vehicle rear side than the battery assemblies 120. The housing 110 is of a box shape made up of multiple walls defining the internal space and formed of a molded aluminum or iron plate. The housing 110 is, for example, a cuboid flattened in the top-bottom direction and has a total of six planes including, for example, a top wall 111, the bottom wall 112, and four side walls 113, 114, 115, and 116. The housing 110 has a partition wall 117 dividing an interior, and a first beam 3 and a second beam 4 reinforcing the bottom wall 112. A blocking wall 118 and a blocking wall 119 are provided on top surfaces of the first beam 3 and the second beam 4.

The top wall 111 is a rectangular wall having long sides extending in the front-rear direction and forming a top surface of the housing 110. The bottom wall 112 is a wall forming a bottom surface of the housing 110 and is of a same shape as the top wall 111. The side wall 113 and the side wall 114 are long and narrow rectangular walls having long sides extending in the front-rear direction and forming, respectively, a left surface and a right surface of the housing 110. The side wall 113 and the side wall 114 have a positional relationship that the side wall 113 and the side wall 114 oppose each other. The side wall 115 and the side wall 116 are long and narrow rectangular walls having long sides extending in the right-left direction and forming, respectively, a rear surface and a front surface of the housing 110. The side wall 115 and the side wall 116 have a positional relationship that the side wall 115 and the side wall 116 oppose each other. The side wall 115 and the side wall 116 are provided to be orthogonal to the side wall 113 and the side wall 114.

Instead of providing the respective walls 111 through 116, the internal space of the housing 110 may be defined by bonding multiple case bodies. Further, multiple projections or depressions may be provided to a surface of a predetermined wall among the multiple walls forming the housing 110 with an aim of increasing a heat dissipation area. In the battery pack 1, a direction along the long sides of the side wall 113 and the side wall 114 corresponds to the front-rear direction, and a direction along the long sides of the side wall 115 and the side wall 116 corresponds to the right-left direction.

The partition wall 117 is parallel to the side wall 116 and located near the side wall 116 in the housing 110 to connect the side wall 113 and the side wall 114. The partition wall 117 extends halfway up the housing 110 in the top-bottom direction from an inner surface of the bottom wall 112. A space 117a is provided between the partition wall 117 and the side wall 116.

For example, a battery management unit is stored in the space 117a. The battery management unit is allowed to communicate with various electronic control units equipped to the vehicle. The battery management unit is a device managing at least a charge amount of the cells 121 and is an example of a battery control unit responsible for controls on the cells 121. The battery management unit may be a device managing an abnormal state, leakage, and so on of the cells 121 while monitoring parameters relating to the cells 121, such as a current, a voltage, and a temperature.

A signal relating to a current value detected by a current sensor is inputted into the battery management unit. As with vehicle ECUs, the battery management unit includes an input circuit, a micro-computer, an output circuit, and so on. Battery information is stored in an internal storage member of the micro-computer at any time as data. The stored data of the battery information is, for example, a battery voltage, a charge current, a discharge current, a battery temperature, and so on in the battery pack 1.

The battery management unit functions also as a control device controlling operations of the first air blower 140A, the second air blower 140B, the air blower 172, and a PTC heater 2. Temperature information detected by a temperature detector detecting a temperature of the cells 121 is inputted into the battery management unit. The temperature detector is provided to every single cell 121 or a predetermined cell 121 among the multiple cells 121. The temperature detector may be formed of a temperature detection line, a temperature sensor, or the like outputting a signal to the battery management unit. When a battery temperature detected by the temperature detector satisfies a battery cooling or battery heating condition, the battery management unit controls respective operations of the first air blower 140A, the second air blower 140B, the air blower 172, and the PTC heater 2.

Figure 2:
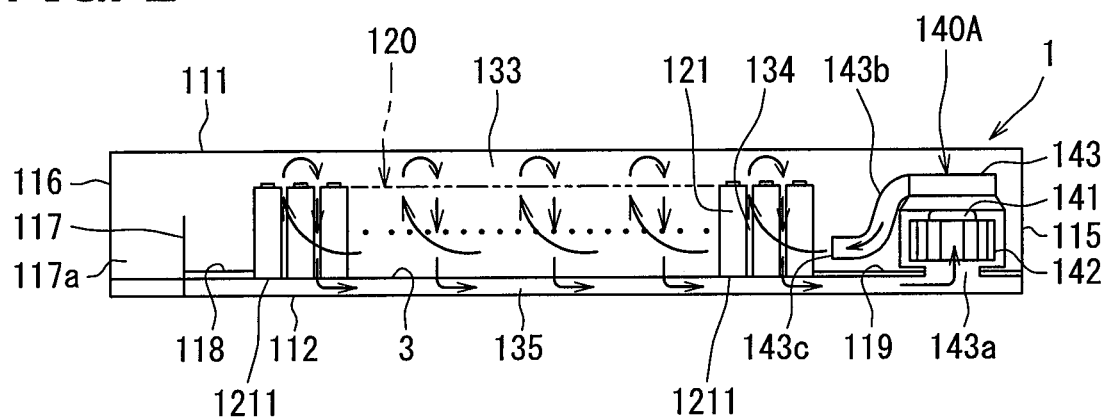
FIG. 2 is a sectional view taken along a line II-II of FIG. 1 when viewed from a direction indicated by arrows.

The first beam 3 and the second beam 4 are reinforcing members to increase strength of the housing 110, and as are shown in FIG. 1 through FIG. 3, multiple beams are provided side by side in the right-left direction on an inside of the bottom wall 112. In the present embodiment, three beams are provided. As is shown in FIG. 3, the three beams are one first beam 3 located near the side wall 113, the second beam 4 located at an intermediate between the side wall 113 and the side wall 114, and another first beam 3 near the side wall 114. The respective beams 3 and 4 are of a long and narrow rod shape, and aligned side by side in the right-left direction at regular intervals on the bottom wall 112 in the housing 110 with a longitudinal direction brought into coincidence with the front-rear direction.

The respective beams 3 and 4 are provided to the housing 110 as separate members of, for example, a rectangular or trapezoidal shape in cross section. More specifically, the respective beams 3 and 4 are of a U shape or an angular U shape in cross section and fixed to the bottom wall 112 with openings faced downward. The battery assemblies 120 are mounted on the top surfaces of the respective beams 3 and 4. Hence, the respective beams 3 and 4 support the corresponding battery assemblies 120 from below on the side of the bottom wall 112 of the housing 110. The respective beams 3 and 4 are made of, for example, an aluminum material or an iron material.

The two first beams 3 are beams located at outermost portions in the right-left direction and provided along the side wall 113 and the side wall 114, respectively. The first beam 3 is in contact with either the side wall 113 or the side wall 114 and the bottom wall 112 and provided integrally as a single unit. Hence, the first beam 3 reinforces the side wall 113, the side wall 114, and the bottom wall 112.

The two first beams 3 and the one second beam 4 are provided at regular intervals. A distance between center lines of adjacent beams is set to be equal to a dimension of the cells 121 in the right-left direction. A dimension between adjacent beams is set to be larger than a width dimension of one beam. The width dimension of the respective beams 3 and 4 means a length of each beam in a direction in which the two first beams 3 and the one second beam 4 are aligned side by side. A plate thickness of the respective beams 3 and 4 is set to be larger than a plate thickness of the bottom wall 112.

As is shown in FIG. 1, a length of the respective beams 3 and 4 in a longitudinal direction is set to be larger than a length of the entire battery assembly 120 in the stacking direction of the cells 121. In other words, the respective beams 3 and 4 are extended to protrude to an outside of the battery assemblies 120 in the front-rear direction at both ends in the longitudinal direction. The respective first beams 3 at the outermost portions in the right-left direction and the second beam 4 at an intermediate position are extended to the side wall 115 until each makes contact with the side wall 115 at one end in the longitudinal direction. Likewise, the respective beams 3 and 4 are extended to the side wall 116 by penetrating through the partition wall 117 until each makes contact with the side wall 116 at the other end in the longitudinal direction.

The blocking wall 118 is a flat plate member, and provided to the respective beams 3 and 4 more on the outer side in the front-rear direction than a region where the cells 121 are provided, that is, at a position close to the partition wall 117. The blocking wall 118 is provided between the partition wall 117 and the battery assemblies 120 and extended from the side wall 113 to the side wall 114 across top surfaces of the respective beams 3 and 4. A space above the first beams 3 at both ends and the second beam 4 located midway is blocked by the blocking wall 118 from a portion of the bottom wall 112 between the partition wall 117 and the battery assemblies 120. The blocking wall 118 is formed of an aluminum plate or an iron plate.

As with the blocking wall 118, the blocking wall 119 is a flat plate member, and provided to the respective beams 3 and 4 more on an outer side in the front-rear direction than the region where the cells 121 are provided, that is, at a position at which the blocking wall 119 reaches the side wall 115. The blocking wall 119 is provided between the side wall 115 and the battery assemblies 120 and extended from the side wall 113 to the side wall 114 across the top surfaces of the respective beams 3 and 4. A space above the first beams 3 at the both ends and the second beam 4 located midway is blocked by the blocking wall 119 from a portion of the bottom wall 112 between the side wall 115 and the battery assemblies 120. The blocking wall 119 is formed of an aluminum plate or an iron plate. The blocking wall 119 has opening holes at positions corresponding to respective inlet ports 143a of the first air blower 140A and the second air blower 140B. The two opening holes form two communication openings through which the respective two inlet ports 143a communicates with a bottom wall passage 135.

Each cell 121 includes an exterior case of a cuboid shape flattened in the front-rear direction, and electrode terminals 121a, such as a positive-electrode terminal and a negative-electrode terminal, protruding to an outside from one end face of the exterior case. The cell 121 corresponds to a battery. Each battery assembly 120 is formed as a one unit by stacking the multiple cells 121 and securing the stacked cells 121 immovably.

In each battery assembly 120, an electrode terminal of one polarity of one cell 121 and an electrode terminal of the other polarity of another adjacent cell 121 are electrically connected with a conductive member, such as a bus bar. The bus bar and the electrode terminals are connected by, for example, screw fastening or welding. Hence, general terminal portions disposed at both ends of the multiple cells 121 electrically interconnected with the bus bar or the like are supplied with electrical power from an outside and discharge to other electrical devices.

Multiple battery assemblies 120 are mounted on the top surfaces of the first beams 3 and the second beam 4. Specifically, the battery assembly 120 provided close to the side wall 113 has a lower end 1211. One end of the lower end 1211 adjacent to the side wall 113 is supported by the first beam 3 from below, and the other end of the lower end 1211 is supported by the second beam 4 from below. Meanwhile, the battery assembly 120 provided close to the side wall 114 has a lower end 1211. One end of the lower end 1211 adjacent to the side wall 114 is supported by the other first beam 3 from below, and the other end of the lower end 1211 is supported by the second beam 4 from below. In the manner as above, each of the battery assembly 120 on the side of the side wall 113 and the battery assembly 120 on the side of the side wall 114 is supported on the corresponding first beam 3 and the second beam 4 at the both ends in the right-left direction.

Hence, the respective first beam 3 increases strength of the housing 110 by uniting with the bottom wall 112 and the battery assembly 120 on the side of the side wall 113 or the battery assembly 120 on the side of the side wall 114 while being sandwiched between the bottom wall 112 and the corresponding battery assembly 120. The second beam 4 increases strength of the housing 110 by uniting with the bottom wall 112 and the two battery assemblies 120 while being sandwiched between the bottom wall 112 and the two battery assemblies 120.

The circulation passage 130 is a passage provided in the housing 110 to let a heat-exchanging fluid flow around the single cell 121, and forms a series of channels connecting a side wall passage 131, another side wall passage 132, a top wall passage 133, a battery passage 134, the bottom wall passage 135, and the air blower 140. The side wall passage 131 is a first fluid passage provided between one battery assembly 120 and the side wall 113, and extends parallel to the side wall 113 and orthogonal to both of the top wall 111 and the bottom wall 112. The side wall passage 132 is a passage provided between the other battery assembly 120 and the side wall 114, and extends parallel to the side wall 114 and orthogonal to both of the top wall 111 and the bottom wall 112. The top wall passage 133 is a passage provided between the top wall 111 and the battery assemblies 120 and extending parallel to the top wall 111.

The side wall passage 131 and the top wall passage 133 connect to each other on an inner side of a boundary between the top wall 111 and the side wall 113. The side wall passage 132 and the top wall passage 133 connect to each other on an inner side of a boundary between the top wall 111 and the side wall 114. Hence, the top wall passage 133 is a passage connected to both of the side wall passage 131 and the side wall passage 132, and a fluid flowing through the side wall passage 131 and a fluid flowing through the side wall passage 132 can mix with each other in the top wall passage 133. The battery passage 134 is a passage provided between two adjacent cells 121 adjacent to each other in the battery assembly 120 and therefore includes multiple battery passages 134 each allowing communication between the top wall passage 133 and the bottom wall passage 135. Hence, a fluid flowing through the top wall passage 133 is separated into the battery passages 134, and the fluids flowing out of the battery passages 134 join with each other in the bottom wall passage 135.

As a positional relationship, an inflow portion of each battery passage 134 opposes an inflow portion of the bottom wall passage 135, which is also an outflow portion of the battery passage 134. Hence, fluid flowing into the battery passage 134 from the top wall passage 133 flows into the bottom wall passage 135 by flowing downward.

The bottom wall passage 135 is provided as a space surrounded by at least the bottom wall 112, the lower end 1211 of each battery assembly 120, and the respective beam 3, 4. The bottom wall passage 135 is a second fluid passage provided downstream of the battery passages 134 and extending toward an inflow portion of the air blower 140. The bottom wall passage 135 also includes a space surrounded by the bottom wall 112, the blocking wall 118, and the beam 3, 4, and a space surrounded by the bottom wall 112, the blocking wall 119, and the beam 3, 4. The bottom wall passage 135 is a passage defined between the first beam 3 and the second beam 4 located adjacently, beneath each battery assembly 120. In the present embodiment, the battery pack 1 includes two bottom wall passages 135 aligned side by side in the right-left direction and extending in the front-rear direction or the battery stacking direction in other words. The two bottom wall passages 135 are independent passages and a fluid does not flow in and out between the two passages.

The air blower 140 is a fluid drive member housed in the housing 110 and forcing a heat-exchanging fluid to circulate in the circulation passage 130. In the present embodiment, the air blower 140 includes a first air blower 140A and a second air blower 140B disposed side by side on the blocking wall 119. Hereinafter, the two air blowers 140A and 140B may be referred to collectively also as the air blower 140. Examples of a fluid forced to circulate in the circulation passage 130 include but not limited to air, various types of gas, water, and refrigerant.

The first air blower 140A and the second air blower 140B are provided symmetrically with respect to a center line extending in the front-rear direction of the housing 110, and are located between the side wall 115 and the respective battery assemblies 120 in the housing 110. Each of the first air blower 140A and the second air blower 140B has a motor 141, a sirocco fan 142, and a fan casing 143. The motor 141 is an electrical device rotationally driving the sirocco fan 142 and provided on an upper side of the sirocco fan 142. The sirocco fan 142 is a centrifugal fan drawing in a fluid in a direction of a rotation shaft and blowing out the fluid in a centrifugal direction, and provided by aligning the rotation shaft to extend in the top-bottom direction.

Figure 4:
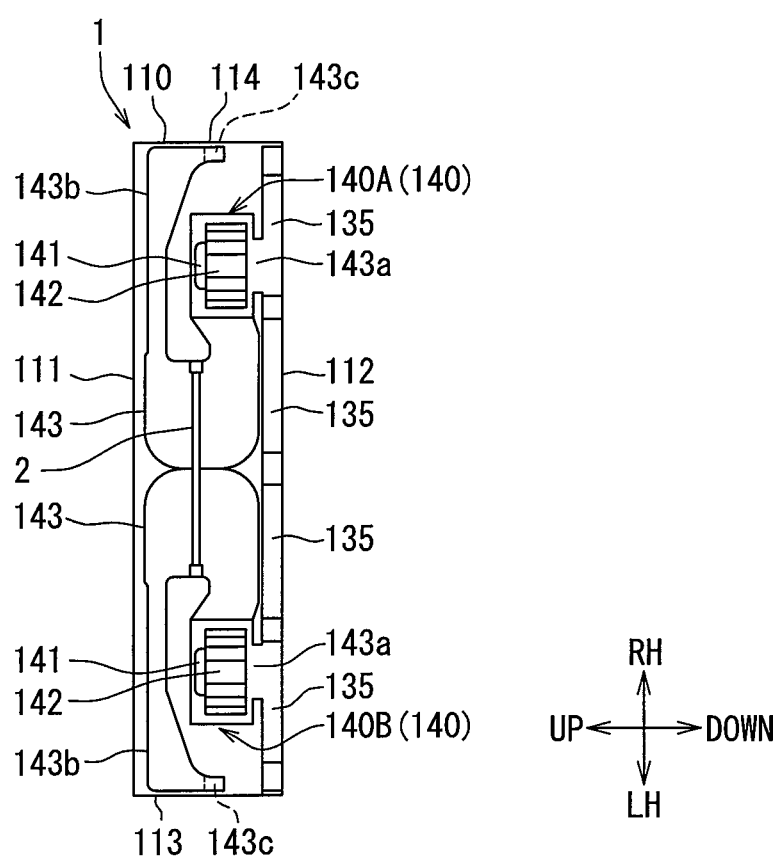
FIG. 4 is a sectional view taken along a line IV-IV of FIG. 1 when viewed from a direction indicated by arrows.

The fan casing 143 is provided to cover the sirocco fan 142 and functions as an air introduction portion which sets draw-in and blow-out directions of a fluid by the sirocco fan 142. The fan casing 143 has the inlet port 143a opening below the sirocco fan 142, an outlet duct 143b guiding the blown-out fluid, and an outlet port 143c opening at a tip end of the outlet duct 143b. As is shown in FIG. 4, each outlet duct 143b forms a passage extending from a side surface of the sirocco fan 142 toward a center of the housing 110 and turning around toward the side wall passage 131 or the side wall passage 132.

The inlet port 143a of the first air blower 140A is disposed to correspond to a position of one communication opening in the blocking wall 119. The inlet port 143a of the second air blower 140B is disposed to correspond to a position of the other communication opening in the blocking wall 119. The inlet port 143a of the first air blower 140A connects to the bottom wall passage 135 located adjacent to the side wall 114 via the corresponding communication opening in the blocking wall 119. The inlet port 143a of the second air blower 140B connects to the bottom wall passage 135 located adjacent to the side wall 113 via the corresponding communication opening in the blocking wall 119.

The outlet port 143c of the first air blower 140A is disposed to connect to the side wall passage 131. The outlet port 143c is disposed at a position close to the bottom wall 112 in the side wall passage 131 to face toward the side wall 116 in a vicinity of a cell 121 nearest to the side wall 115 among the multiple stacked cells 121. The outlet port 143c of the second air blower 140B is disposed to connect to the side wall passage 132. The outlet port 143c is disposed at a position close to the bottom wall 112 in the side wall passage 132 to face toward the side wall 116 in a vicinity of a cell 121 nearest to the side wall 115 among the multiple stacked cells 121.

A heating device heating a fluid to have a predetermined temperature is provided in the fan casing 143 at an intermediate position in the top-bottom direction. The heating device may be, for example, the PTC heater 2 furnished with a self-temperature-controlling function.

As are shown in FIG. 3 and FIG. 5, the first internal fin 150 is a heat-exchange promoting fin protruding from an inner surface of the side wall 113 or the side wall 114, and facilitates housing heat dissipation via the side wall 113 and the side wall 114. Hence, the side wall 113 and the side wall 114 function as a heat dissipation portion which dissipates heat to an outside of the housing 110 by contact with a fluid flowing out from the first air blower 140A and the second air blower 140B.

The second internal fin 151 is a heat-exchange promoting fin protruding from an inner surface of the top wall 111 adjacent to the side wall 113 or the side wall 114, and facilitates housing heat dissipation via the top wall 111. The first internal fin 150 and the second internal fin 151 are made of an excellent heat conductive material, such as an aluminum material or an iron material.

The first internal fin 150 is provided to two areas, e.g., on the side wall 113 and the side wall 114, symmetrically with respect to the center line extending in the front-rear direction of the housing 110. The second internal fin 151 is provided to the top wall 111 on the side of the side wall 113 and on the side of the side wall 114 symmetrically with respect to the center line extending in the front-rear direction of the housing 110. The respective internal fins 150 and 151 adopt, for example, straight fins with which flow resistance against a fluid can be set relatively low. The straight fin includes a thin-plate substrate portion and a large number of parallel-aligned thin-plate fin portions each protruding perpendicularly from the substrate portion to define fluid passages between two adjacent fin portions. It should be appreciated, however, that the respective internal fins 150 and 151 are not limited to straight fins and may adopt other types of fins, such as corrugated fins and offset fins, instead.

As is shown in FIG. 5, the substrate portion of the first internal fin 150 is of a long and narrow right triangular shape linking a corner A, a corner B, and a corner C, where the corner B has substantially a right angle. A length of a long side AB extending in the front-rear direction is set to be equal to a length of the cell stack 120A in the stacking direction. A length of a short side BC extending in the top-bottom direction is set to a dimension slightly smaller than a dimension of the side wall 113, 114 in the top-bottom direction. The substrate portion is disposed in such a manner that the position in the front-rear direction corresponds to a position of the battery assembly 120. The short side BC is located adjacent to the side wall 116. The corner A opposing the short side BC is located adjacent to the side wall 115. The long side AB is disposed along a top side of the side wall 113 or 114. The substrate portion is bonded to an inner surface of the side wall 113 or 114. Hence, a hypotenuse CA of the substrate portion is a side inclined downward as extending from the side wall 115 to the side wall 116.

The fin portions of the first internal fin 150 protrude perpendicularly from the substrate portion toward the multiple cells 121. To let more fluid flow between the fin portions, the fin portion protrudes such that the tip end comes to a position in close proximity to the side surface of the multiple cells 121. Plate surfaces of the fin portions are set to incline toward the side wall 116 with respect to the top-bottom direction as extending from bottom to top. A length of the fluid passages defined by the fin portions is increased as being located from the side wall 115 to the side wall 116.

The substrate portion of the second internal fin 151 is of a long and narrow triangular shape linking a corner D, a corner E, and a corner F. A length of a long side DE extending in the front-rear direction is set to be equal to a length of the long side AB of the substrate portion of the first internal fin 150. The second internal fin 151 is disposed in such a manner that a position of the substrate portion in the front-rear direction corresponds to the position of the first internal fin 150. A short side EF is located adjacent to the side wall 115. The corner D opposing the short side EF is located adjacent to the side wall 116. The long side DE is disposed along a side of the top wall 111 in the front-rear direction. The substrate portion of the second internal fin 151 is bonded to an inner surface of the top wall 111 adjacently to the fin portions of the first internal fin 150.

The fin portions of the second internal fin 151 protrude perpendicularly from the substrate portion toward the multiple cells 121. To let more fluid flow between the fin portions, the fin portion protrudes such that the tip end come to a position in close proximity to top surfaces of the multiple cells 121. Plate surfaces of the fin portions are set to incline toward the side wall 116 with respect to the right-left direction and a degree of inclination increases toward the center of the housing 110. A length of the fluid passages defined by the fin portions is reduced as being located from the side wall 115 to the side wall 116. The fluid passages defined by the fin portions of the second internal fin 151 are connected continuously to the respective fluid passages defined by the fin portions of the first internal fin 150.

As is shown in FIG. 6, the first external fins 160 and the second external fins 161 are heat-exchange promoting fins provided to an outside of the housing 110. The respective external fins 161 and 162 are made of an excellent heat conductive material, such as an aluminum material or an iron material. The first external fin 160 is provided on the side of the side wall 113 and the side of the side wall 114 symmetrically with respect to the center line extending in the front-rear direction of the housing 110. The second external fin 161 is provided on the top wall 111 at two areas on the side of the side wall 113 and the side of the side wall 114 symmetrically with respect to the center line extending in the front-rear direction of the housing 110.

The respective external fins 160 and 161 adopt, for example, corrugated fins with which heat conducting performance for a fluid can be set relatively high. A corrugated fin is entirely of a wavy shape. A large number of louvers are provided to mutually opposing wavy surfaces and a fluid passage is defined between two mutually opposing wavy surfaces and between two adjacent louvers. The respective external fins 160 and 161 may be straight fins like the respective internal fins 150 and 151, corrugated fins without louvers, offset fins, or the like instead.

Multiple, for example, two first external fins 160 are provided in one set. One set is provided to each of the side wall 113 and the side wall 114 at a position corresponding to the first internal fin 150 by aligning a direction of a series of waves in the front-rear direction while being slightly offset toward the side wall 116. Multiple, for example, two second external fins 161 are provided in one set. Two sets of the second external fins 161 are provided to the top wall 111, respectively, on the side of the side wall 113 and on the side of the side wall 114 at positions corresponding to the respective second internal fins 151 by aligning a direction of a series of waves in the front-rear direction while being slightly offset toward the side wall 115 in comparison with the first external fins 160.

As is shown in FIG. 8, the external duct 170 is a duct forcing a fluid to flow along an outer surface of the housing 110. A fluid is, for example, conditioned air in the compartment. The external duct 170 is of a flattened shape in cross section and provided to the outer surface of the housing 110, such as the side wall 113, the side wall 114, the top wall 111 on the side of the side wall 113, the top wall 111 on the side of the side wall 114, and the side wall 115. The external fins 160 and the external fins 161 are included by the external duct 170.

Both ends of the external duct 170 on the side of the side wall 116 form inlet portions through which conditioned air is drawn inside. A wind direction device 171 is provided to a downstream side immediately after each inlet portion to split the drawn conditioned air to a stream flowing below the first external fin 160 and a stream flowing more center side of the housing 110 than the second external fin 161. The air blower 172 is provided inside the outer duct 170 at a center on the side of the side wall 115. An upper part and a lower part of the air blower 172 form outlet portions from which the conditioned air is blown out. For example, a turbo fan is used as the air blower 172.

Figure 11:
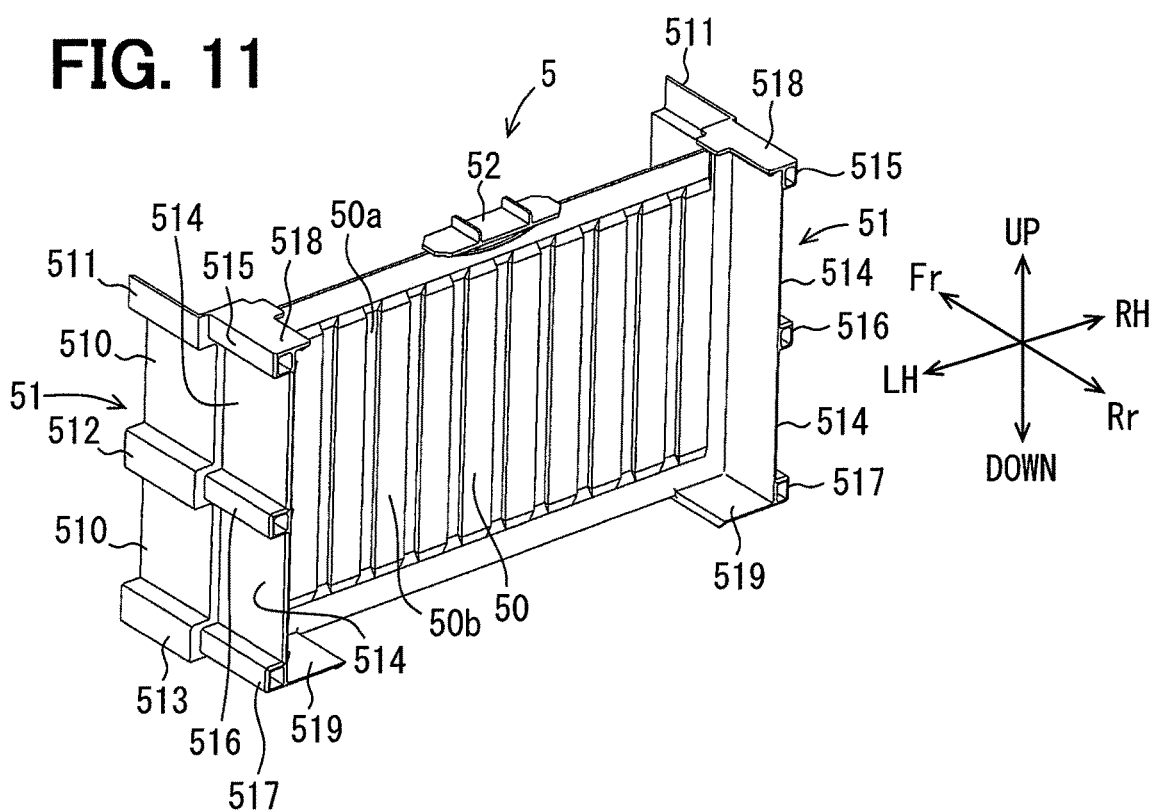
FIG. 11 is a perspective view of a supporting member.
Figure 12:
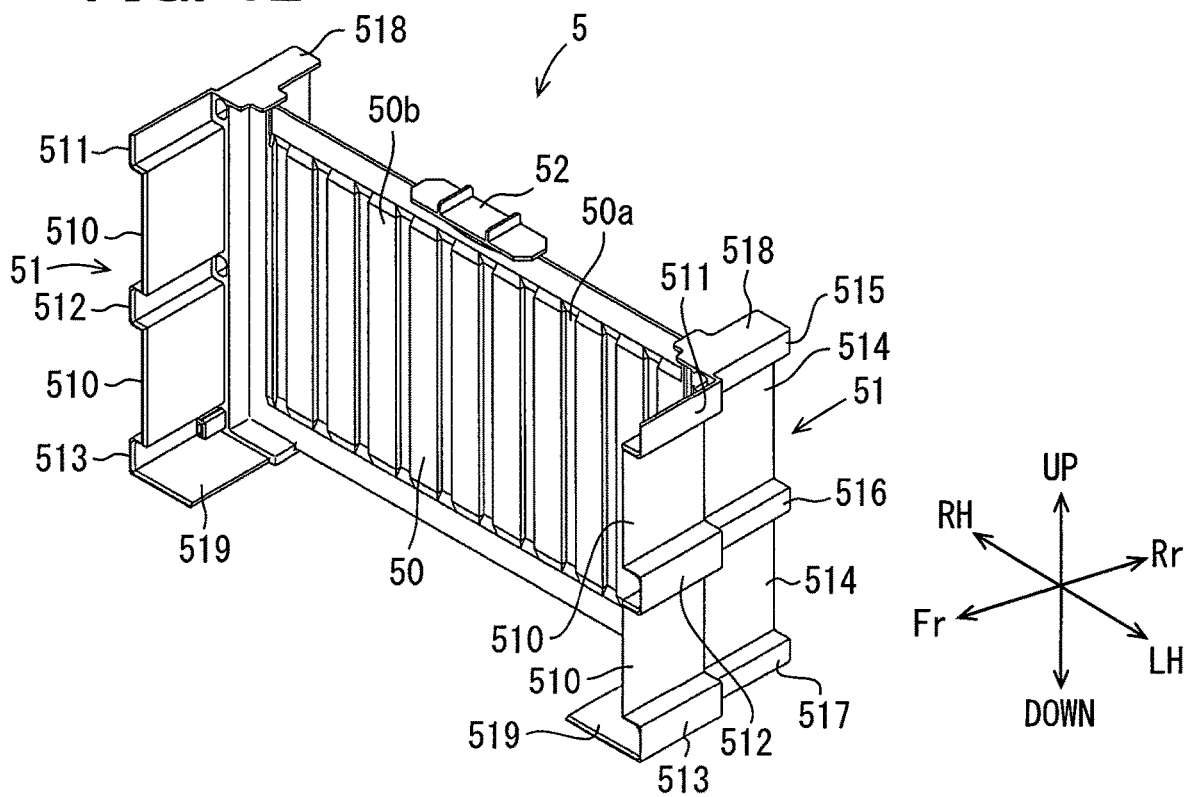
FIG. 12 is another perspective view of the supporting member.
Figure 14:
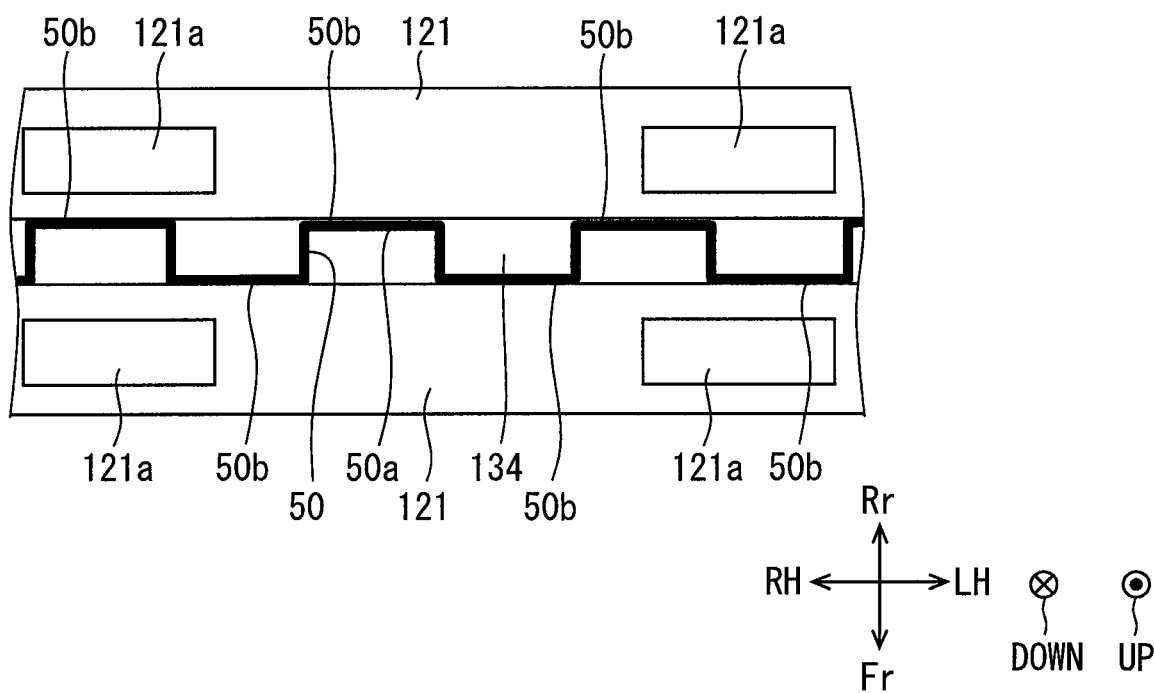
FIG. 14 is a top view showing a battery passage.

As is shown in FIG. 14, the battery passage 134 is provided between two adjacent cells 121 stacked in the battery assembly 120, and formed by a spacer member 5 interposed between two adjacent cells 121. As are shown in FIG. 11 and FIG. 12, each spacer member 5 has a partition wall portion 50 separating two adjacent cells 121.

The spacer member 5 includes the partition wall portion 50, a side wall portion 51 provided at both ends of the partition wall portion 50 to cover side surfaces of the cell 121, and a restriction portion 52 partially covering the top surfaces of respective cells 121 located on the both sides of the partition wall portion 50. The spacer member 5 is molded from, for example, resin and all the portions are combined into a single unit. The spacer member 5 is also furnished with a function of insulating the two cells 121 located on the both sides.

The partition wall portion 50 is of a flat plate shape. The partition wall portion 50 is of a size large enough to cover main surfaces of the cells 121 and opposes the main surfaces. The main surface of the cell 121 means a surface having a largest area among surfaces of the flattened cell 121. The partition wall portion 50 has multiple groove portions 50a each extending in the top-bottom direction in a length equal to a length of the main surfaces in the top-bottom direction. The multiple groove portions 50a are aligned side by side in the right-left direction at predetermined intervals. Hence, the partition wall portion 50 has a flat portion 50b which is long and narrow in the top-bottom direction between every two adjacent groove portions 50a. In the battery assembly 120 including the spacer members 5 each being sandwiched between two adjacent cells 121, swelling of the main surfaces of the cells 121 is restricted by the multiple flat portions 50b by contact with the main surfaces of the cells 121. Long and narrow passages extending in the top-bottom direction and defined between the main surfaces and the respective groove portions 50a form the battery passages 134.

A securing member 6 secures both end faces of the battery assembly 120 in the stacking direction by giving a securing force pressing the both end faces in the stacking direction. In the battery assembly 120 formed into a single unit by alternately stacking the spacer members 5 and the cells 121, the side wall portions 51 are portions covering side surfaces of the cells 121 and making contact with the securing member 6 securing the multiple cells 121 immovably. Hence, the side wall portions 51 are also furnished with a function of protecting the side surfaces of the cells 121 from the securing member 6.

Figure 13:
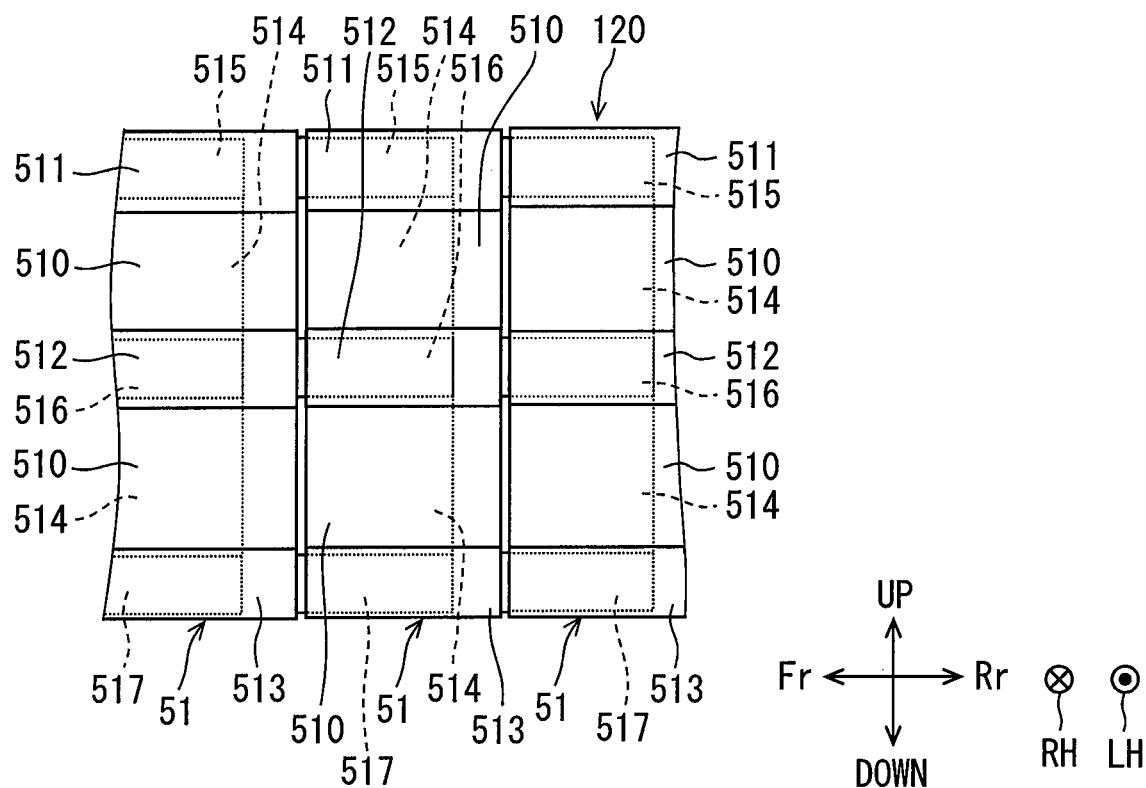
FIG. 13 is a side view of multiple supporting members combined with each other.

Each side wall portion 51 has a one side wall portion occupying one half in the battery stacking direction, and the other side wall portion occupying the other half. In the following, a description will be given on an assumption that one side wall portion is on the vehicle front side and the other side wall portion is on the vehicle rear side. As is shown in FIG. 13, in the battery assembly 120, the other side wall portion of one spacer member 5 on the vehicle front side is located on an inside of one side wall portion of the adjacent spacer member 5 on the vehicle rear side. That is, one side wall portion of the spacer member 5 on the vehicle rear side and the other side wall portion of the spacer member on the vehicle front side overlap in such a manner that the former covers the latter from outside. Hence, each spacer member 5 is of a shape in which all the portions forming one side wall portion protrude outward entirely in the right-left direction in comparison with the other side wall portion.

One side wall portion is formed by integrally combining a top protrusion 511, a middle protrusion 512, a bottom protrusion 513, an upper flat portion 510 connecting the top protrusion 511 and the middle protrusion 512, and a lower flat portion 510 connecting the bottom protrusion 513 and the middle protrusion 512. The other side wall portion is formed by integrally combining a top protrusion 515, a middle protrusion 516, a bottom protrusion 517, an upper flat portion 514 connecting the top protrusion 515 and the middle protrusion 516, and a lower flat portion 514 connecting the bottom protrusion 517 and the middle protrusion 516.

Between the adjacent spacer members 5, the top protrusion 511, the middle protrusion 512, the bottom protrusion 513, the upper flat portion 510, and the lower flat portion 510 cover the top protrusion 515, the middle protrusion 516, the bottom protrusion 517, the upper flat portion 514, and the lower flat portion 514, respectively, from the outside. That is, the top protrusion 511 is a protrusion larger than the top protrusion 515 and set with a larger outward protruding dimension, and the bottom protrusion 513 is a protrusion larger than the top portion 517 and set with a larger outward protruding dimension. Also, the middle protrusion 512 is a protrusion having a larger outward protruding dimension than the middle protrusion 516.

Hence, the side wall portion 51 forms a wall portion having a step in the battery stacking direction or the front-rear direction in other words for one side wall portion protrudes outward in comparison with the other side wall portion. Accordingly, the middle protrusion 512, the top protrusion 511, and the bottom protrusion 513 have shapes and sizes large enough to store the middle protrusion 516, the top protrusion 515, and the bottom protrusion 517, respectively. Also, the upper flat portion 510 and the lower flat portion 510 are provided at positions at which the upper flat portion 510 and the lower flat portion 510 overlap the upper flat portion 514 and the lower flat portion 514, respectively, on the inside.

In the battery assembly 120 fabricated in the manner as above, one side wall portion and the other side wall portion overlap at all the corresponding portions. Hence, strength in a side wall portion of the spacer members 5 alternately stacked with the cells 121 can be increased. The securing member 6 is provided in the battery stacking direction wherever the upper flat portions 510 overlap the upper flat portions 514 and wherever the lower flat portions 510 overlap the lower flat portions 514 to bridge adjacent overlapping portions. Hence, the configuration in which one side wall portion overlaps the other side wall portion contributes to limiting a damage on the cells 121 caused by the securing member 6.

Each of one side wall portion and the other side wall portion is of an uneven shape with protruding surfaces and recessed surfaces alternately aligned in the top-bottom direction. Hence, misalignment in the top-bottom direction between two adjacent spacer members 5 can be prevented. The side wall portion 51 is provided with a step in the battery stacking direction formed by one side wall portion and the other side wall portion. Hence, displacement of each spacer member 5 in the battery stacking direction can be limited and hence misalignment among the spacer members 5 in the battery stacking direction can be prevented.

Figure 9:
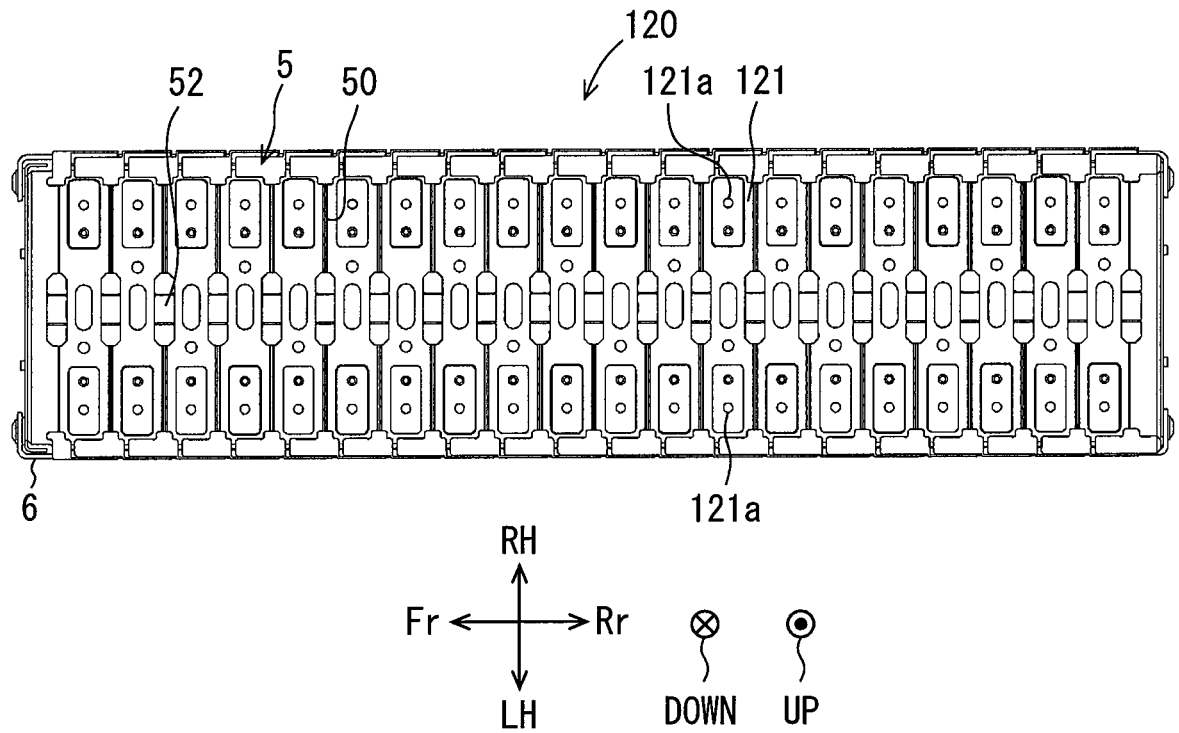
FIG. 9 is a top view showing a configuration of a battery assembly.
Figure 10:
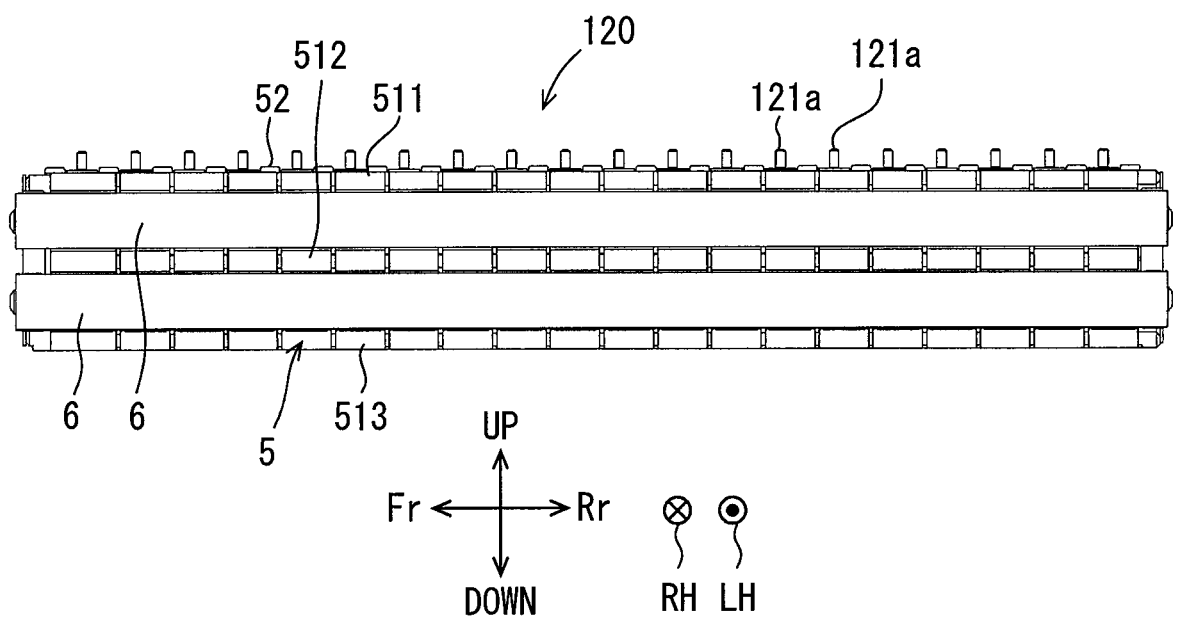
FIG. 10 is a side view showing the configuration of the battery assembly.

The restriction portion 52 is a plate-shaped portion having a predetermined length in the right-left direction and protruding from an upper end of the partition wall portion 50 to both sides in the battery stacking direction with respect to the partition wall portion 50. In the fabricated battery assembly 120, the restriction portion 52 is provided at a position at which the restriction portion 52 opposes a center of upper end faces of two cells 121 sandwiching one spacer member 5 from both sides and in contact with or slightly spaced from the opposing portion. Hence, as are shown in FIG. 9 and FIG. 10, the restriction portion 52 is capable of restricting upward displacement of the cells 121. The restriction portion 52 has ribs protruding upward from a surface. The multiple ribs contribute to an increase in strength of the restriction portion 52 and hence contribute to an increase in displacement restricting force exerted on the cells 121 by the restriction portion 52.

The top protrusion 515 has a top wall portion 518 having a predetermined length in the battery stacking direction and protruding inward. The bottom protrusion 517 has a bottom wall portion 519 having a predetermined length in the battery stacking direction and protruding inward. In the fabricated battery assembly 120, the top wall portions 518 support the upper end face of the cell 121 at both ends in the right-left direction. The bottom wall portions 519 support a lower end face of the cell 121 at both ends in the right-left direction. In the manner as above, the spacer member 5 is capable of holding the cell 121 from above and below with supporting forces of the top wall portions 518 and the bottom wall portions 519. The bottom wall portions 519 correspond to the lower end 1211 of the battery assembly 120 supported from below by the first beam 3 and the second beam 4.

In the manner as above, each spacer member 5 supports the adjacent cell 121 by surrounding the side surfaces, the top surface, and the bottom surface. Hence, the spacer member 5 restricts misalignment of the cell 121 with respect to the spacer member 5 not only in the battery stacking direction but also in the top-bottom direction and the right-left direction. In short, the spacer member 5 provides a supporting force in a direction in which a securing force of the securing member 6 is hardly exerted.

An operation of the battery pack 1 will now be described. The cell 121 generates heat by self-heating at a time of outputting when a current flows out and at a time of inputting when the cell 121 is charged. The cell 121 is affected by a temperature outside of the housing 110 depending on seasons. The battery management unit constantly monitors a temperature of the cells 121 by using the temperature detector and controls operations of the first air blower 140A, the second air blower 140B, the air blower 172, and the PTC heater 2 according to the temperature of the cells 121.

The battery management unit varies rotation speeds of the respective sirocco fans 142 by controlling voltages to have a duty ratio at an arbitrary value from 0% to 100% of a maximum voltage and applying the controlled voltages to the first air blower 140A and the second air blower 140B according to a temperature of the cells 121. The battery management unit may also actuate the PTC heater 2 in addition to the first air blower 140A and the second air blower 140B or may also actuate the air blower 172 in addition to the first air blower 140A and the second air blower 140B depending on a temperature of the cells 121.

For example, when the first air blower 140A and the second air blower 140B alone are actuated, a fluid in the housing 110 circulates in the circulation passage 130 as are indicated in FIG. 1 through FIG. 3. The fluid is drawn into the first air blower 140A and the second air blower 140B through the respective inlet ports 143a. A fluid blown out from each outlet port 143c via the corresponding outlet duct 143b flows into either the side wall passage 131 or the side wall passage 132.

The fluid flowing into each of the side wall passage 131 and the side wall passage 132 flows smoothly from the side of the bottom wall 112 to the side of the top wall 111 along the fin portions of the first internal fins 150 disposed with inclination. Each of the side wall passage 131 and the side wall passage 132 is a long passage of a flattened shape in cross section extending along a long side. Each has a smaller sectional area at an inlet for a flowing fluid than a rest of the top wall passage 133, the battery passages 134, and the bottom wall passages 135. Hence, a reasonable flow velocity can be ensured for the fluid and a dynamic pressure dominates in the side wall passage 131 and the side wall passage 132. Hence, heat of the fluid with a flow velocity in each of the side wall passage 131 and the side wall passage 132 is effectively transmitted to the first internal fins 150 and dissipated to the outside via the side wall 113 or the side wall 114.

The fluid subsequently flows smoothly to the fin portions of the second internal fins 151 connected continuously to the respective first internal fins 150 and flows into the top wall passage 133 along the fin portions. A sectional area at an inlet for the fluid flowing toward the top wall 111 is markedly larger than the sectional areas at the respective inlets of the side wall passage 131 and the side wall passage 132 for the fluid flowing inside. Hence, the fluid has a low flow velocity. A static pressure dominates in the top wall passage 133. Hence, the fluid flowing into the top wall passage 133 from each of the side wall passage 131 and the side wall passage 132 readily spreads uniformly in the top wall passage 133.

As is shown in FIG. 1, the fluid flowing into the top wall passage 133 from the side wall passage 131 mainly spreads above the battery assembly 120 on the side of the side wall 113. The fluid flowing into the top wall passage 133 from the side wall passage 132 mainly spreads above the battery assembly 120 on the side of the side wall 114. Heat of the fluid flowing into the top wall passage 133 is transmitted from the second internal fins 151 to the top wall 111 or directly transmitted to the top wall 111 and dissipated to the outside.

The fluid flowing into the top wall passage 133 eventually reaches the bottom wall passages 135 by passing through the respective battery passages 134. Herein, the side wall passage 131, the side wall passage 132, and the top wall passage 133 correspond to positive pressure spaces when the fluid is blown out from the first air blower 140A and the second air blower 140B whereas the bottom wall passages 135 correspond to negative pressure spaces when the fluid is drawn into the first air blower 140A and the second air blower 140B. A pressure difference between the spaces moves the fluid continuously from the side of the top wall passage 133 to the side of the bottom wall passages 135. Heat of the respective cells 121 is transmitted to the fluid when the fluid passes through the battery passages 134.

The fluid flowing into each bottom wall passage 135 flows downstream in a space between the beams along the bottom wall 112 and reaches the inlet port 143a of the first air blower 140A or the inlet port 143a of the second air blower 140B. Heat of the fluid flowing downstream in the bottom wall passage 135 is transmitted to the bottom wall 112 and dissipated to the outside. In the manner as above, heat of the fluid, that is, heat of the cells 121 is dissipated to the outside from the side wall 113, the side wall 114, the top wall 111, and the bottom wall 112 while the fluid circulates in the circulation passage 130 in the housing 110. Heat exchange at the side wall 113, the side wall 114, and the top wall 111 is promoted by the first internal fins 150 and the second internal fins 151.

For example, when the temperature of the cell 121 is low, the PTC heater 2 is actuated in addition to the first air blower 140A and the second air blower 140B as mentioned above. In such a case, a fluid flowing the respective outlet ducts 143b is heated by the PTC heater 2. While the heated fluid circulates in the circulation passage 130 in the housing 110, the respective cells 121 are heated to a properly operable temperature by the heated fluid. Consequently, poor performance of the cold cells 121 can be remedied.

Conversely, when the temperature of the cell 121 is high, the air blower 172 is actuated in addition to the first air blower 140A and the second air blower 140B. In such a case, conditioned air in the compartment is drawn into the external duct 170 from the inlet portions of the external duct 170.

As is shown in FIG. 8, the conditioned air drawn into the external duct 170 is split by the wind direction device 171 to a stream of air flowing below the first external fins 160 and a stream of air flowing more on the center side of the housing 110 than the second external fin 161. The respective streams of air pass across the respective external fins 160 and 161 and join into a single stream of air, which is blown out from the outlet portions provided at the top and the bottom of the air blower 172.

Heat of the fluid in the housing 110 is transmitted to the conditioned air via the first internal fins 150, the second internal fins 151, the side wall 113, the side wall 114, the top wall 111, the first external fins 160, and the second external fins 161, and dissipated to the outside. Hence, an exchange of heat of the fluid in the housing 110 is further promoted by the respective external fins 160 and 161 in addition to the respective internal fins 150 and 151. Consequently, the respective cells 121 are forcedly cooled to an appropriate temperature in a short time.

As has been described above, the battery pack 1 includes the battery assembly 120, the circulation passage 130, the first air blower 140A, and the second air blower 140B, which are housed in the housing 110. By additionally providing the PTC heater 2, the first internal fins 150, and the second internal fins 151, the respective cells 121 can be temperature-regulated and heated appropriately without leaking an operating sound of the first air blower 140A and the second air blower 140B into the compartment. By further providing the first external fins 160, the second external fins 161, the external duct 170, and the air blower 172, forced cooling can be performed when the cells 121 are hot.

Effects obtained by the battery pack 1 of the first embodiment will now be described. The battery pack 1 includes the battery assembly 120, the fluid drive member driving a fluid which cools the battery assembly 120, and the housing 110 in which to house the battery assembly 120 and the fluid drive member. The circulation passage 130 is provided in the housing 110 to form a series of air flow channels for the fluid flowing out from the fluid drive member to flow back into the fluid drive member after exchanging heat with the cells 121. The battery pack 1 further includes the multiple beams 3 and 4 integrally provided to the bottom wall 112 of the housing 110 to support the battery assembly 120 from the lower side. The circulation passage 130 includes the first fluid passage provided between the battery assembly 120 and the side wall 113, 114 which dissipate heat by contact with the fluid flowing out from the fluid drive member, the battery passage 134, and the second fluid passage. The second fluid passage is provided downstream of the battery passage 134 and extending toward the inflow portion of the fluid drive member. A fluid flowing the first fluid passage flows into the second fluid passage after passing through the battery passages 134. The second fluid passage is a passage surrounded by at least the beams 3, 4, the bottom wall 112, and the lower end 1211 of the battery assembly 120.

According to the configuration as above, the circulation passage 130 is formed to let a fluid flowing the first fluid passage flow into the second fluid passage by flowing through the battery passage 134. Hence, a fluid flowing out from the fluid drive member can be prevented from flowing into the second fluid passage before passing through the first fluid passage. Accordingly, a fluid flowing out from the fluid drive member sequentially flows the first fluid passage and the battery passage 134 and flows back into the fluid drive member by flowing the second fluid passage. Owing to the configuration as above, a fluid carrying heat absorbed from the cells 121 while passing through the battery passage 134 is let to flow the first fluid passage. Heat can be thus dissipated to the outside of the housing 110 when the fluid circulating in the circulation passage 130 flows the first fluid passage. Consequently, the battery pack 1 capable of achieving efficient housing heat dissipation by realizing reliable heat dissipation via the housing 110 can be provided.

In the battery pack 1, the multiple beams 3 and 4 are provided on the bottom wall 112. Hence, the respective beams 3 and 4 function as reinforcing members and strength of the housing 110 can be increased. The multiple cells 121 are provided on the respective beams 3, 4. Hence, should an impact be applied from the outside of the housing 110, the impact can be received by the respective beams 3, 4. The cells 121 can be thus protected against the impact. Consequently, the battery pack 1 is capable of realizing efficient heat dissipation through the housing and protecting the batteries against an impact.

The battery pack 1 is capable of restricting the increase in a volume of circulating air by operating the fluid drive member at a high output to realize efficient heat dissipation from the housing. Consequently, the battery pack 1 capable of restricting leakage of a noise to the outside of the housing and reducing energy consumption, such as power consumption to drive the fluid drive member, can be obtained.

In the battery pack 1, a fluid flowing the first fluid passage entirely flows into the second fluid passage by flowing through the battery passage 134. According to the configuration as above, the circulation passage 130 is formed to let a full volume of fluid flowing the first fluid passage flow into the second fluid passage by flowing through the battery passage 134. Hence, a fluid flowing out from the fluid drive member is prevented from flowing into the second fluid passage before passing through the first fluid passage. Accordingly, a fluid flowing out from the fluid drive member sequentially flows the first fluid passage and the battery passage 134 and entirely flows back into the fluid drive member by flowing the second fluid passage. Owing to the configuration as above, a full volume of fluid carrying heat absorbed from the cells 121 while flowing the battery passage 134 is let to flow the first fluid passage. Heat can be thus dissipated to the outside of the housing 110 when a full volume of fluid circulating in the circulation passage 130 flows the first fluid passage. Consequently, housing heat dissipation via the housing 110 can be more efficient.

The bottom wall passage 135 forming a part of the circulation passage 130 is defined by a wall forming the respective reinforcing beam 3, 4 and the bottom wall 112. That is, beam members used for reinforcement can be used also to define the passages. Hence, the number of members can be reduced and costs can be reduced by using beams of a simple shape. Consequently, the bottom wall passage 135 can be formed without having to provide a separate duct in the housing 110.

By using the respective beams 3 and 4 as members defining a part of the bottom wall passage 135, an increase in size of the battery pack 1 can be restricted in comparison with a case where the beams are provided merely to reinforce the housing 110.

Each battery assembly 120 includes the multiple spacer members 5, each of which is interposed between two adjacent cells 121 and defines one battery passage 134. Each spacer member 5 has the side wall portion 51 covering the side surface of the cell 121 extending in the top-bottom direction in the battery assembly 120. The side wall portion 51 is a wall portion forming the battery passage 134 for a fluid flowing into the battery passage 134 from the upper side of the cell 121 to flow into the bottom wall passage 135 as the second fluid passage by flowing downward. According to the configuration as above, the spacer member 5 can be provided for defining the battery passage 134 and furnished with a function of preventing a fluid from taking a shortcut from the first fluid passage to the second fluid passage while increasing strength by protecting the side walls of the battery assembly 120.

At least one of the multiple beams 3 and 4 is provided to have an end in the longitudinal direction in closer proximity to a wall of the housing 110 than the battery assembly 120 in the housing 110. According to the configuration as above, ends of the first beams 3 and the second beam 4 in the longitudinal direction are extended to an outside of a region where the multiple cell 121 are provided. Hence, should an impact be applied to the battery pack 1, the impact can be absorbed by the beams in a larger region. Consequently, the cells 121 can be protected more effectively.

At least one of the multiple beams 3 and 4 is provided to have the end in the longitudinal direction that is in contact with the wall of the housing 110. According to the configuration as above, a structure can be obtained, in which a gap is not produced between the end of the first beams 3 or the second beam 4 in the longitudinal direction and the wall of the housing 110. Hence, owing to the effect of increasing strength achieved by the beams, should an impact be applied to the battery pack 1, the housing 110 undergoes deformation in a restricted range. For example, damage on the cells 121 and an electrical device in the housing 110 can be restricted.

Second Embodiment

Figure 15:
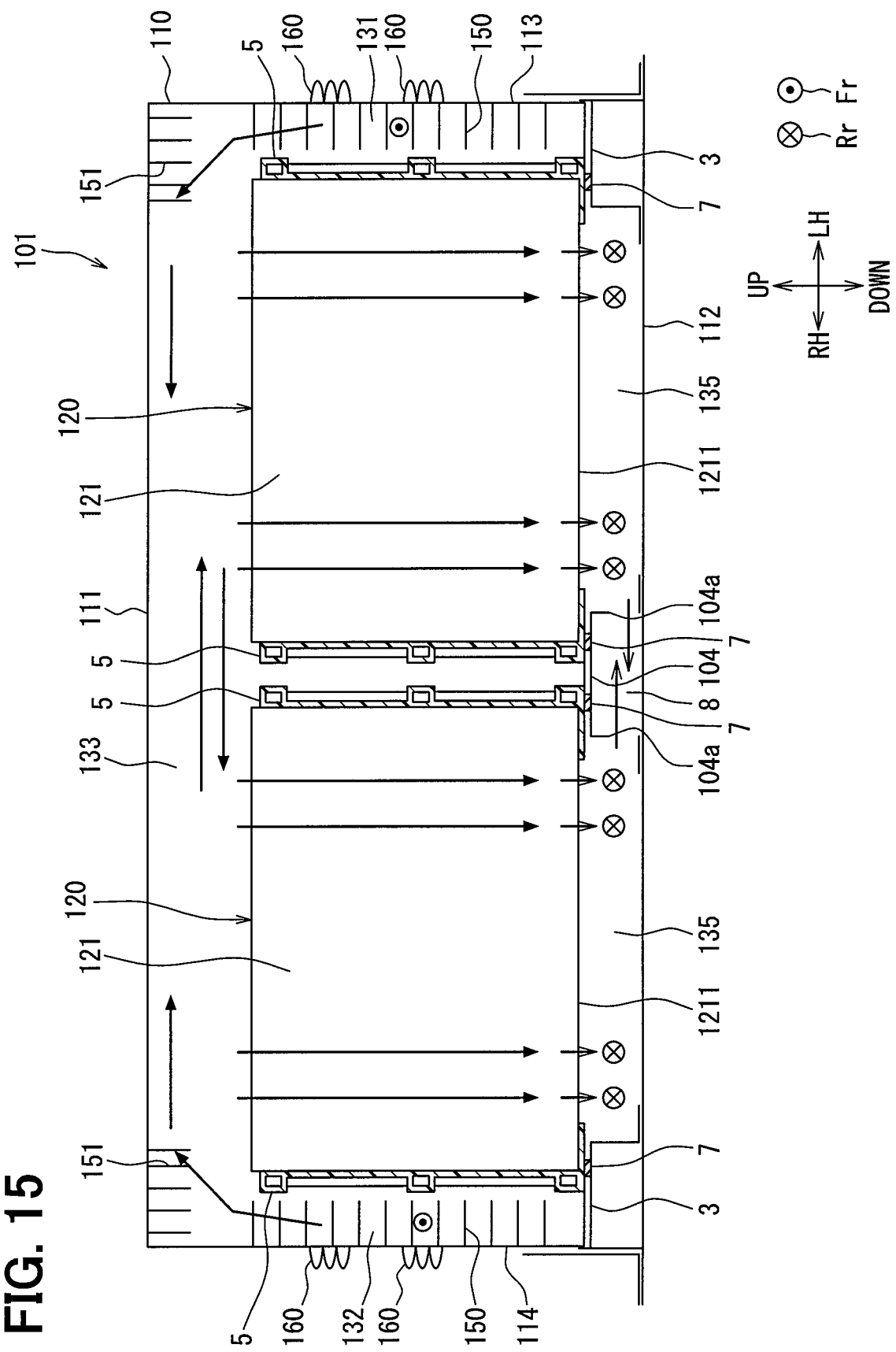
FIG. 15 is a sectional view showing a configuration of a battery pack according to a second embodiment, and a flow of fluid in the battery pack.
Figure 16:
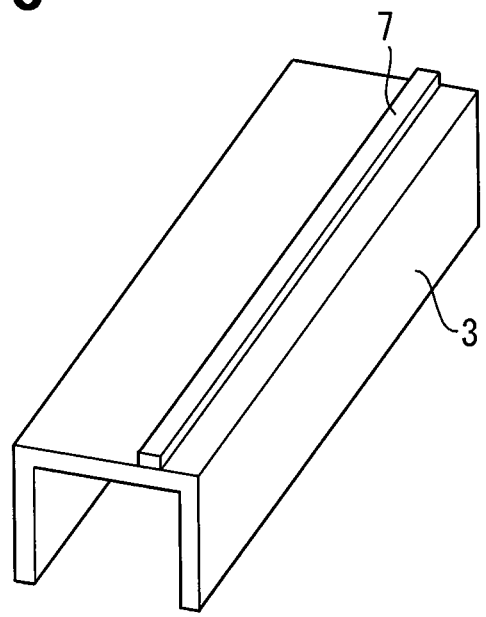
FIG. 16 is a partial perspective view of a first beam and a seal member.
Figure 17:
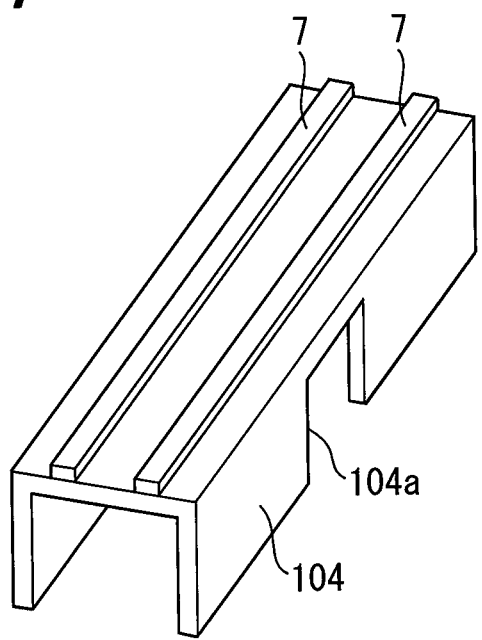
FIG. 17 is a partial perspective view of a second beam and a seal member.

A second embodiment will describe a battery pack 101 with reference to FIG. 15 through FIG. 17. The battery pack 101 is a modification of the battery pack 1 of the first embodiment above. In FIG. 15 through FIG. 17, components labelled with same reference numerals used in the drawings referred to in the first embodiment above are same components and exert same functional effects. The following will describe a content different from the first embodiment above.

In contrast to the battery pack 1, the battery pack 101 includes a communication passage 8 via which the bottom wall passages 135 respectively corresponding to two battery assemblies aligned side by side in a right-left direction communicate with each other.

As is shown in FIG. 15, an inner space surrounded by an inner surface of a second beam 104 and a bottom wall 112 defines the communication passage 8 connecting the bottom wall passage 135 on a vehicle left side as one side and the bottom wall passage 135 on a vehicle right side as the other side. As are shown in FIG. 15 and FIG. 17, the second beam 104 has through holes 104a penetrating through respective side walls of the second beam 104 facing the corresponding bottom wall passages 135 located on both sides of the second beam 104. The inner space described above forms the communication passage 8 by connecting to the respective bottom wall passages 135 through the respective through holes 104a. Hence, the communication passage 8 functions as a part of the bottom wall passage 135 located below the battery assembly 120.

The communication passage 8 enables the multiple bottom wall passages 135 aligned on right and left of a vehicle to communicate with each other. Hence, a passage sectional area of the bottom wall passages 135 located downstream of battery passages 134 can be larger, which can in turn reduce circulation resistance.

Elastically deformable seal members 7 of a strip shape are provided in a full length of the battery assemblies 120 in a battery stacking direction between respective first beams 3 and lower ends 1211 of the respective battery assemblies 120. One seal member 7 of a strip shape is also provided between the second beam 4 and the lower end 1211 of each battery assembly 120. The respective seal members 7 are elastically deformed to increase the tight adhesion to the respective battery assemblies 120 and the respective beams 3 and 4, so as to contribute to separation between the side wall passage and the bottom wall passage to prevent a fluid from flowing in and out. The seal member 7 may be made of various types of packing materials, such as natural rubber and synthetic rubber.

As has been described above, the battery pack 101 includes the seal member 7 blocking a flow of a fluid between the first beam 3 and the second beam 4, and the battery assembly 120. The seal member 7 interposed between each first beam 3 and the corresponding battery assembly 120 blocks a fluid flowing into the bottom wall passage 135 as a second fluid passage from the side wall passage 131 or the side wall passage 132 as a first fluid passage. Owing to the configuration as above, a flow of a fluid from the side wall passage 131 and the side wall passage 132 to the corresponding bottom wall passages 135 can be blocked in a reliable manner. Hence, the fluid can be prevented from leaking from the side wall passage 131 and the side wall passage 132 into the corresponding bottom wall passages 135. An increase in circulation resistance caused when the fluid circulating in the circulation passage 130 is split to flow through an unexpected portion can be restricted. Consequently, housing heat dissipation can be more efficient by limiting a reduction in flow velocity of the fluid.

Other Embodiments

The present disclosure is not limited to the embodiments described above and can be modified in various manners within the scope of the present disclosure. Functions furnished to a single component in the embodiments above may be allocated to two or more components or functions furnished to two or more components may be allocated intensively to a single component.

The structures of the embodiments above are mere examples and the present disclosure is not limited to the scope of the description above. The scope of the present disclosure is determined by the appended claims and meanings equivalent to and all modifications falling within the scope of the appended claims are included in the present disclosure.

The embodiments above have described that the battery pack has two battery assemblies. However, the number of the battery assemblies is not limited to two. That is, the present disclosure includes a case where one battery assembly is housed in a housing of a battery pack, a case where multiple battery assemblies are aligned side by side in one direction, and a case where multiple battery assemblies are aligned side by side in two directions intersecting with each other.

The embodiments above have described that the housing 110 is a hexahedron forming a cuboid. However, a shape of a housing is not limited to the example above. For example, the housing 110 may be a polyhedron having seven or more planes or at least one plane may be a curved plane. The housing 110 may have a top wall of a dome shape including a bowed surface, or may be of a trapezoidal shape in longitudinal cross section. The top wall of the housing 110 is a wall having a positional relationship that the top wall opposes the bottom wall and may be either of a flat surface shape or a curved surface shape. A side wall of the housing 110 may be a wall extending from the bottom wall in a direction intersecting with the bottom wall or a wall extending from the top wall in a direction interesting with the top wall. A boundary between the top wall and the side wall of the housing 110 may produce a corner or form a curved surface. A boundary between the bottom wall and the side wall of the housing 110 may produce a corner or form a curved surface.

The embodiments above have described that three beams are provided between the bottom wall and the respective battery assemblies. However, two or four or more beams may be provided according to the number of the battery assemblies.

In the embodiments above, ends of the respective beams 3 and 4 on the side of the side wall 116 may be flush with the ends of the respective battery assemblies 120.

In the embodiments above, the respective beams 3 and 4 may be either hollow members or solid members. The respective beams 3 and 4 may be separate members from the bottom wall, which are integrally fixed to the bottom wall or the side walls. The respective beams 3 and 4 may be provided by providing the bottom wall with protrusions protruding toward an inner part of the housing.

The embodiments above have described that a fluid is forced to circulate in the circulation passage 130 by using multiple air blowers. However, a fluid may be forced to circulate in the circulation passage 130 by using a single air blower.

A fan of the air blower included in the battery pack may be fans other than a sirocco fan, such as an axial flow fan and a turbo fan.

In the embodiments above, the PTC heater 2 may not be necessarily provided in the fan casings 143 and may be provided to an outside of the fan casings 143 in the housing 110.

The internal fin and the external fin of the embodiments may be provided by fixing fins, which are separate parts, to walls of the housing 110, or a part of the walls of the housing 110 may be formed into a fin shape and used as fins.

The invention claimed is:

1. A battery pack comprising:
   a battery assembly including a plurality of batteries;
   a fluid drive member that drives fluid cooling the battery assembly;
   a housing housing the battery assembly and the fluid drive member;
   a circulation passage defined in the housing to form a series of flow channels for the fluid flowing out of the fluid drive member to flow back into the fluid drive member after exchanging heat with the batteries; and
   a plurality of beams disposed integrally with a bottom wall of the housing to support the battery assembly from a lower side, wherein
   the circulation passage includes
      a first fluid passage defined between the battery assembly and a wall of the housing that is a heat dissipation portion which dissipates heat to an outside of the housing through a contact with the fluid flowing out of the fluid drive member,
      a battery passage defined between the batteries adjacent to each other in the battery assembly, and
      a second fluid passage downstream of the battery passage and extending toward an inflow portion of the fluid drive member,
   the first fluid passage, the battery passage, and the second fluid passage are a series of passages provided for the fluid flowing through the first fluid passage to flow into the second fluid passage by passing through the battery passage, the second fluid passage is surrounded by at least the beams, the bottom wall, and a lower end of the battery assembly, the second fluid passage is one of two second fluid passages defined on respective sides of one of the plurality of beams, the one of the plurality of beams has a through hole that defines a communication passage connecting the two second fluid passages with each other, the fluid drive member has an outlet port positioned in a side wall passage of the first fluid passage defined between the battery assembly and a first side wall of the housing adjacent to the bottom wall, the housing has a top wall, the first side wall is adjacent to the top wall and to the bottom wall, the housing further has a second side wall adjacent to the top wall and the bottom wall and perpendicular to the first side wall, the first fluid passage further has a top wall passage defined between the side wall passage and the battery passage in a flow direction of the fluid, the side wall passage is defined by between the battery assembly and the first side wall to extend parallel to the first side wall, the outlet port of the fluid drive member is adjacent to a battery of the plurality of batteries that is closest to the second side wall, and the battery pack further includes:
- a first internal fin protruding from an inner side of the second side wall;
- a second internal fin protruding from an inner side of the top wall; and
- an external fin disposed on an outer side of the second side wall at a position corresponding to the first internal fin.

2. The battery pack according to claim 1, wherein:
the fluid flowing through the first fluid passage entirely flows into the second fluid passage after passing through the battery passage.

3. The battery pack according to claim 1, wherein:
the battery assembly includes a plurality of spacer members each of which is interposed between the adjacent batteries to define the battery passage; and the spacer member has a side wall portion covering a side surface of the battery extending in a top-bottom direction in the battery assembly, and forming the battery passage to let the fluid flowing into the battery passage from an upper side of the battery flow into the second fluid passage by flowing downward.

4. The battery pack according to claim 1, further comprising:
a seal member provided between the beam and the battery assembly to block a flow of the fluid, wherein the seal member blocks a flow of the fluid from the first fluid passage to the second fluid passage.

5. The battery pack according to claim 1, wherein:
at least one of the plurality of beams is provided, in the housing, to have an end in a longitudinal direction which is closer to the wall of the housing than the battery assembly is.

6. The battery pack according to claim 5, wherein:
the at least one of the plurality of beams is provided such that the end in the longitudinal direction is in contact with the wall of the housing.

7. The battery pack according to claim 1, wherein:
the outlet port is located between the bottom wall and the top wall.

8. The battery pack according to claim 1, wherein:
the fluid drive member has an inlet port connected to the second fluid passage.

9. The battery pack according to claim 1, wherein:
the fluid drive member is located adjacent to a second side wall of the housing perpendicular to the first side wall.

10. The battery pack according to claim 1, wherein:
the plurality of batteries respectively have electrode terminals which are located adjacent to the top wall of the housing.

11. The battery pack according to claim 10, wherein:
the electrode terminals face the top wall of the housing.

* * * * *